United States Patent
Kamimaki et al.

[11] Patent Number: 5,867,148
[45] Date of Patent: Feb. 2, 1999

[54] SPACE-SAVING INFORMATION PROCESSING APPARATUS

[75] Inventors: Hideki Kamimaki, Yokohama; Kiyokazu Nishioka, Odawara; Koichi Kimura, Yokohama; Takashi Maruyama, Ebina; Tsuguji Tachiuchi, Odawara; Koichi Isaji, Nagoya; Tsuyoshi Nakagawa, Hadano; Nobuo Tsuchiya, Fujisawa; Yoshiyuki Amano, Kumamoto; Taisuke Kashima, Urawa; Akira Takahashi, Hidaka; Tadashi Kyoda, Hadano; Ryooichi Mizuno, Aichi-ken, all of Japan

[73] Assignees: Hitachi, Ltd., Tokyo; Hitachi Video & Information System, Inc., Kanagawa-ken, both of Japan

[21] Appl. No.: 912,165

[22] Filed: Jul. 10, 1992

[30] Foreign Application Priority Data

Jul. 12, 1991 [JP] Japan .................................. 3-172638
Sep. 19, 1991 [JP] Japan .................................. 3-239990
Sep. 30, 1991 [JP] Japan .................................. 3-252081

[51] Int. Cl.$^6$ ............................................. G09G 5/00
[52] U.S. Cl. ........................... 345/169; 345/905; 364/708
[58] Field of Search ..................................... 345/168, 169, 345/905; 364/708; 361/680, 681, 683, 331, 792, 794; D14/100, 106; 400/682, 685, 691, 693

[56] References Cited

U.S. PATENT DOCUMENTS

| | | | |
|---|---|---|---|
| 4,903,221 | 2/1990 | Krenz | 364/708 |
| 5,107,402 | 4/1992 | Malgouires | 361/393 |
| 5,159,533 | 10/1992 | Kuang | 361/391 |
| 5,175,672 | 12/1992 | Conner et al. | 345/905 |
| 5,229,757 | 7/1993 | Takamiya et al. | 345/168 |
| 5,329,427 | 7/1994 | Hogolahl | 361/730 |
| 5,353,202 | 10/1994 | Ansell et al. | 361/818 |
| 5,440,450 | 8/1995 | Lau et al. | 361/695 |

*Primary Examiner*—Steven J. Saras
*Assistant Examiner*—Matthew Luu
*Attorney, Agent, or Firm*—Antonelli, Terry, Stout & Kraus, LLP

[57] ABSTRACT

An information processing apparatus includes in its body at least a power supply unit, a disk type storage and a printed circuit board arranged in a predetermined order and further has a keyboard unit which can be sandwiched between the display unit and a keyboard unit supporting portion extending from the body by pivotally moving the display unit. A detector for detecting the detachment of the keyboard unit from the body may be provided to restrict the range of pivotal movement of the display unit in accordance with a detection signal of the detector. Further, the display unit may be provided with pilot light emitting portions, thereby making it possible to recognize a condition of the information processing apparatus.

27 Claims, 34 Drawing Sheets

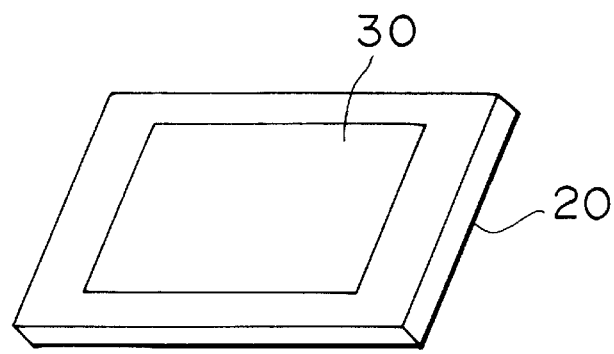
FIG.3A
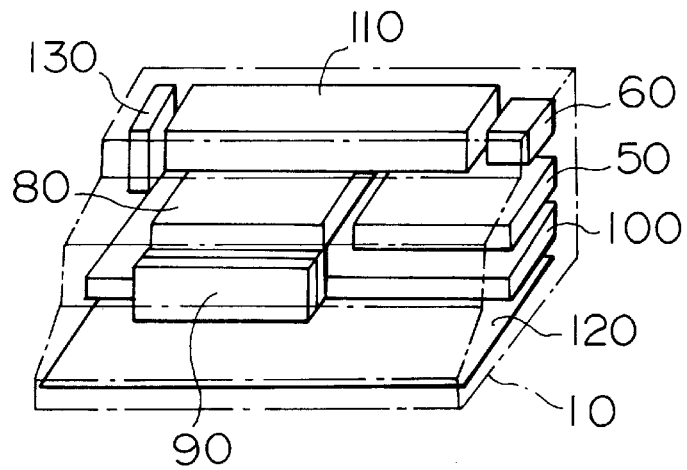
FIG.3B
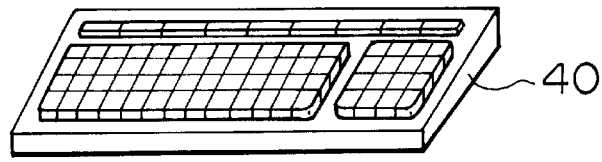
FIG.3C
FIG. 4
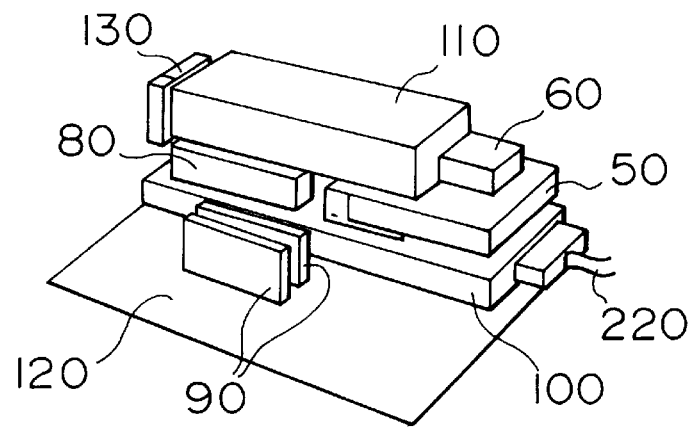

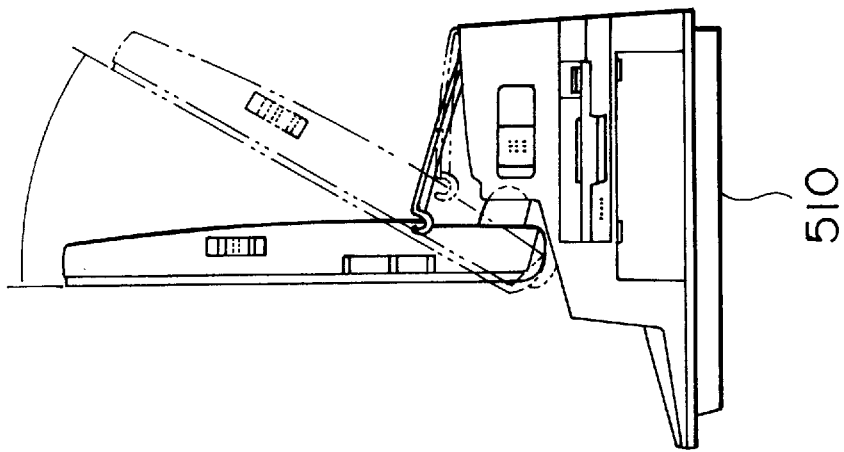
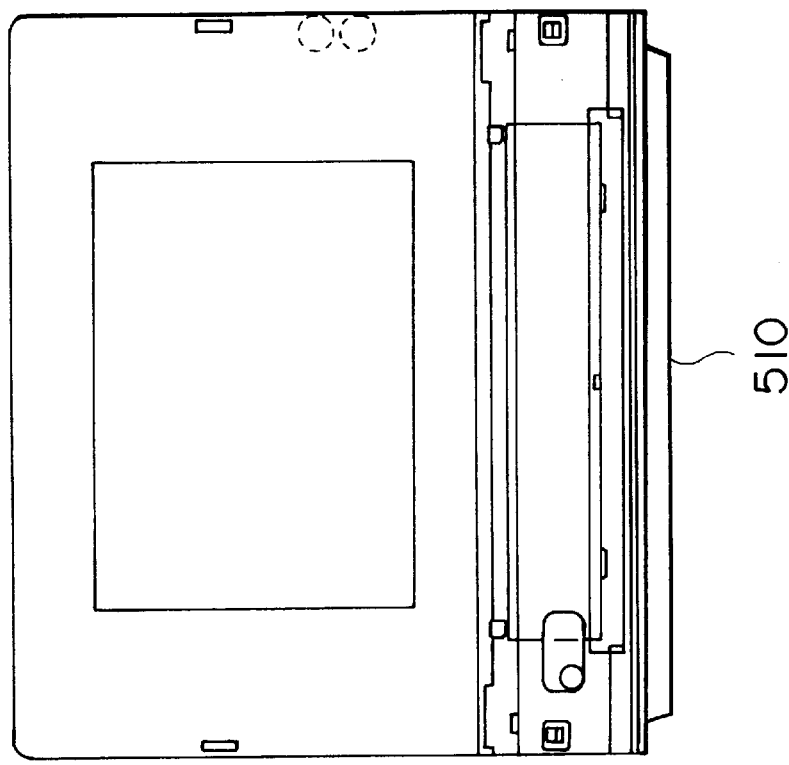

FIG. 34
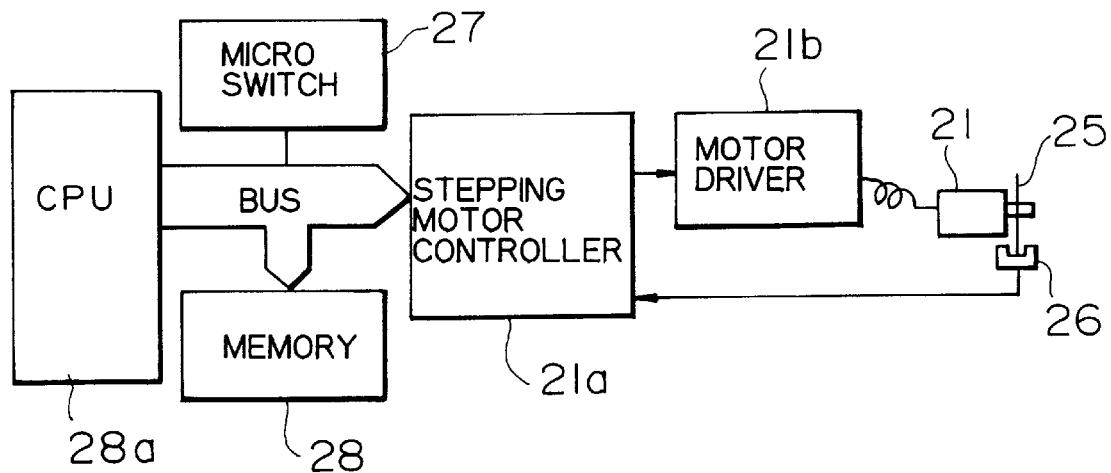
FIG. 35A    FIG. 35B
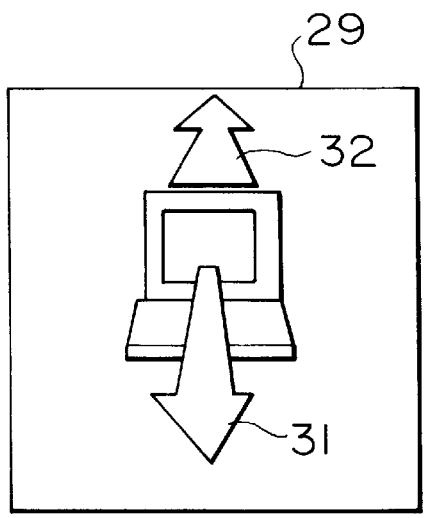 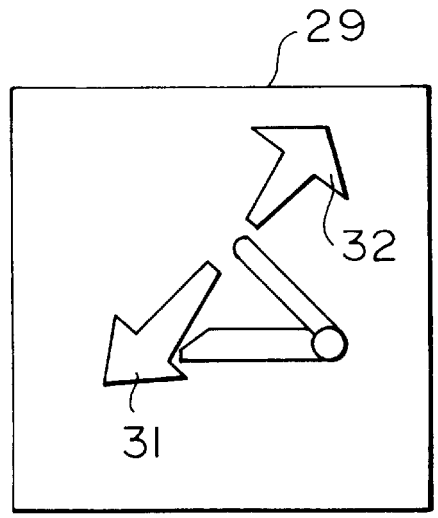

SPACE-SAVING INFORMATION PROCESSING APPARATUS

BACKGROUND OF THE INVENTION

The present invention relates to a space-saving information processing apparatus, such as a personal computer or a work station which performs an office work processing or the like.

At the present time, an aim is taken at a shift to new office configurations because of demands for the improvement in workship environments backed by demands for the improvement in quality of life. In recent years, one principal subject in an office planning is to form a functional and comfortable living space where a creativity is demonstrated and the work makes progress with a high efficiency. Especially, the effective utilization of a space is requested for the purpose of structuring a comfortable office. In order to satisfy such a request, it is necessary to review information processing equipments, such as computer equipments or work stations which are used in large numbers at offices.

A typical construction of an information processing apparatus such as a computer equipment or a work station is disclosed in U.S. Pat. No. 4,571,456 by Grid Systems Corporation.

SUMMARY OF THE INVENTION

Generally, an information processing equipment, such as a computer equipment or a work station has a fixed installation area at each of the time of operation and the time of non-operation and a vertically elongated structure, and the improvement of a productivity in an office work with importance attached to performance and function is contemplated first of all. Also, the size of a keyboard is made small for the purpose of realization of a small-size information processing apparatus, thereby losing a user interface and the easiness of use. Further, since hooks for fixing a display unit to a keyboard with the display unit being put on the keyboard projects from display unit at the time of use, it is necessary to give consideration to a visual hindrance on a surface of the display unit to a user. Besides, it is necessary to give consideration to the transfer of the equipment on a desk.

Accordingly, as to effective use of the office space, environment and safety, also input and display devices relating with operability of user, it loses to readily see the display screen and operability caused by down sizing, thereby having inconsistency against implementation of a new office environment.

An object of the present invention is to provide a space-saving information processing apparatus such as a small-size work station which has an improved human interface and a good use and can be realized with a small size.

Another object of the present invention is to provide a space-saving information processing apparatus in which a visual angle of a display unit can be adjusted, thereby preventing the display unit from being broken.

According to a first aspect of the embodiments of the present invention, an information processing apparatus comprises a body having a processing function, a display unit, and an input unit independent from the body, the input unit being sandwiched between the body and the display unit when the input unit is in a non-operation condition.

The display unit may be pivotally coupled to the body. In this case, it is preferable that the body has an input unit supporting portion protruding forward from the lower side of a front surface of the body and the input unit is sandwiched between the input unit supporting portion and the display unit, when the input unit is in the non-operation condition.

Also, it is preferable that the input unit supporting portion is assembled to hold the input unit at a predetermined angle, at which an input operation is easy, in a state in which the display unit is opened apart from the input unit and the body is placed on a horizontal surface. The thickness of the tip or end side of the input unit supporting portion may be smaller than that of the body side thereof.

It is preferable that the thickness or height of the body is the largest at a back portion thereof. Also, it is preferable that the body has leg portions on a back surface to allow the body to make stand with the back surface being used as an installation surface.

It is preferable that the input unit supporting portion has a resting portion which can rest the input unit so as to make it stand. Also, it is preferable that the state of the input unit rested by the resting portion is a state in which the input unit is made stand against the body and the display unit. Further, it is preferable that the input unit does not cover or hide the whole surface of a display screen of the display unit in a state when standing the input unit.

It is preferable that the body has an expansion unit insertion portion on the front side thereof.

The information processing apparatus may comprise a body including at least a body case, one or more disk type storage units, a power supply unit and a printed circuit board having electronic parts mounted thereon, in which a relationship in vertical position between the units in the body case is such that the power supply unit is positioned at the uppermost portion, the disk type storage unit is positioned under the power supply unit and a first printed circuit board is positioned under the disk type storage unit.

It is preferable that the power supply unit and the disk type storage unit are arranged on the back side of the body and the first printed circuit board is arranged along a bottom surface of the body.

It is preferable that the one or more disk type storage units are laterally arranged side by side.

It is preferable that a heat discharging fan is provided between a side surface of the body case and the power supply unit and the body case has an air outlet at a position corresponding to the heat discharging fan.

It is preferable that the body case has an air intake on the side surface thereof and at a position lower than the disk type storage unit.

A second printed circuit board may be arranged at a height or position between the first printed circuit board and the disk type storage unit.

Alternatively, a memory mounting board may be provided on a portion of the first printed circuit board which is not positioned just under the disk type storage unit.

With the above construction, the present invention enables the effective utilization of an office space and the improvement in office environment as follows.

Since the input unit, for example, a keyboard, when it is in a non-operation condition, is brought into a state in which the input unit is sandwiched between the input unit supporting portion and the display unit, it is possible to surely hold the input unit.

Since the input unit supporting portion can be provided with an inclination with which the tip side becomes low, a good use and an improved operability are obtained in the case where the input unit is placed on the input unit supporting portion.

Since the back portion of the body is made thicker or higher, it is possible to use the back portion as an installation surface in a non-operation condition, thereby attaining a space saving. Even in this case, a sufficient stability can be obtained by providing legs.

Since it is possible to make the input unit stand against the body or the like by providing the resting portion such as an antiskid hook or groove on the input unit supporting portion, there can be attained a space saving on a desk and the protection of a display screen by the keyboard in the case where the apparatus is not used temporarily. Also, since the input unit is made stand against the body or the like so that it does not hide the whole of the display screen, it is possible to easily recognize the operating state of the apparatus or a third person can perceive a condition of the apparatus in use, thereby preventing an erroneous processing from being performed on the apparatus under operation.

Since the disk type storage unit, such as a hard disk supply and the power supply unit having heavy weight, are arranged on the back side of the body, it is possible to improve the stability when the display unit is made stand.

With the above arrangement, a flow path of a cooling air can be formed by the disk type storage unit and so on. Also, a high-efficiency cooling becomes possible and a work upon mounting of a memory board is facilitated.

According to a second aspect of the embodiments of the present invention, an information processing apparatus comprises a body having a processing function, a display unit for displaying information, the display unit being pivotally coupled to the body, an input unit for entering data, the input unit being independent from the body, an input unit supporting portion extending from the body so that the input unit can be sandwiched between the input unit supporting portion and the pivotally moved display unit, a separation detecting unit for detecting the separation of the input unit from the body, and a pivotal movement restricting unit for restricting the range of pivotal movement of the display unit in accordance with the detection of detachment by the detachment detecting unit.

With the above construction, when the input unit is detached from the body, the detachment of the input unit is detected by the detachment detecting unit. The pivotal movement restricting unit restricts the range of pivotal movement of the display unit in response to the detection of detachment by the detachment detecting unit. Thus, when the input unit is detached from the body, the range of pivotal movement of the display unit is restricted. Therefore, even if an obstacle is present at a location where the input unit is to be positioned in the case where it is assumed that the input unit is not detached from the body, the display unit hitting on the obstacle is eliminated, thereby making it possible to prevent the display unit from being damaged.

Also, when any obstacle is detected by an obstacle detecting unit, the range of pivotal movement of the display unit is restricted. Therefore, the display unit hitting on the obstacle is eliminated, thereby preventing the display unit from being damaged. The obstacle detecting unit can be applied to either an information processing apparatus in which an input unit can be detached from a body or an information processing apparatus and an input unit cannot be detached from a body.

According to a third aspect of the embodiments of the present invention, a multi-layer printed circuit board is disposed in a case having a body accommodated therein, circuit elements of a processor section for performing a data processing are arranged on a first end portion of the board, circuit elements of an input/output control section for making a controller for an input/output device are arranged on a second end portion of the board, and circuit elements of a display control section for making a display controller are arranged between the first and second end portions. Thereby, a construction similar to that in the first aspect of the embodiments is provided. Further, pilot portions are provided at a display surface and a non-display surface of a display unit. By a lightened condition of the pilot portion, it is possible to confirm that a power supply is in a turned-on condition even if the display unit is not operated.

BRIEF DESCRIPTION OF THE DRAWINGS

FIGS. 3A, 3B and 3C show the construction of the processing apparatus as a whole;

FIG. 4 is a view for explaining the internal construction of a body;

FIGS. 21A and 21B are front and side views showing another example in which a base is provided to the processing apparatus;

FIG. 34 is a block diagram showing the circuit construction of the device shown in FIG. 32;

FIGS. 35A and 35B are views for explaining a display unit control window;

DESCRIPTION OF THE PREFERRED EMBODIMENTS

Embodiments of the present invention will now be explained in reference to the accompanying drawings.

A space-saving information processing apparatus or work station according to a first embodiment of the present invention is shown in FIGS. 1 to 22.

Figure 1:
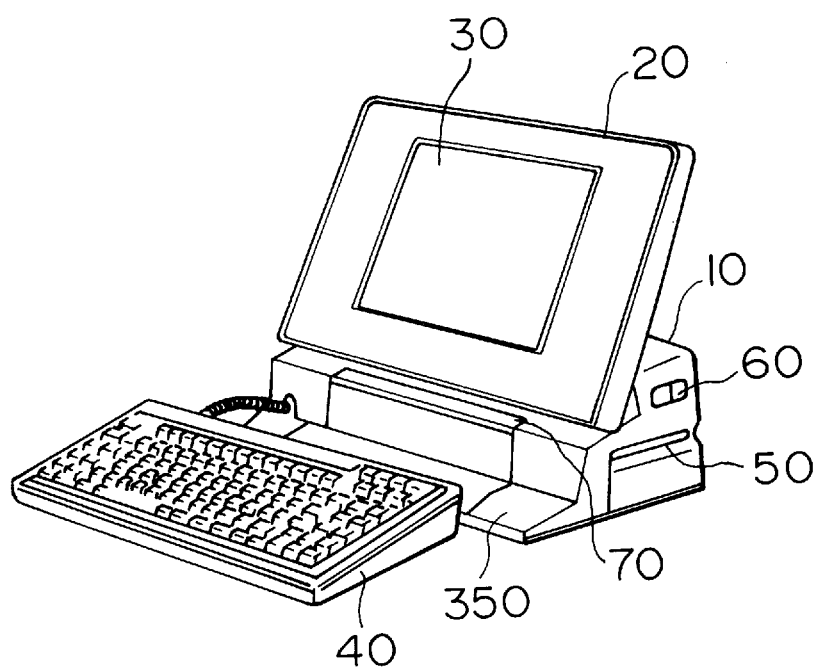
FIG. 1 is a perspective view of a space-saving information processing apparatus according to a first embodiment of the present invention.

FIG. 1 shows in perspective view the construction of a basic casing of the space-saving information processing apparatus in the present embodiment. This space-saving apparatus is of a keyboard-detachable and desktop type and is mainly composed of a display unit 20, a body 10 and a keyboard unit 40.

At a front surface portion of the body 10, a keyboard/body fixing step 350 extends protruding forward. Also, at the front surface portion of the body 10 is provided a portion 70 for inserting an SIMM (single in-line memory module) which is a memory module having a small mounting area. On the other hand, at a back portion of the body 10 is provided a 3.5 inch floppy disk 50 and a power switch 60.

The display unit 20 includes a liquid crystal display 30. The keyboard unit 20 takes a separatable or detachable structure in consideration of the operability.

Figure 2:
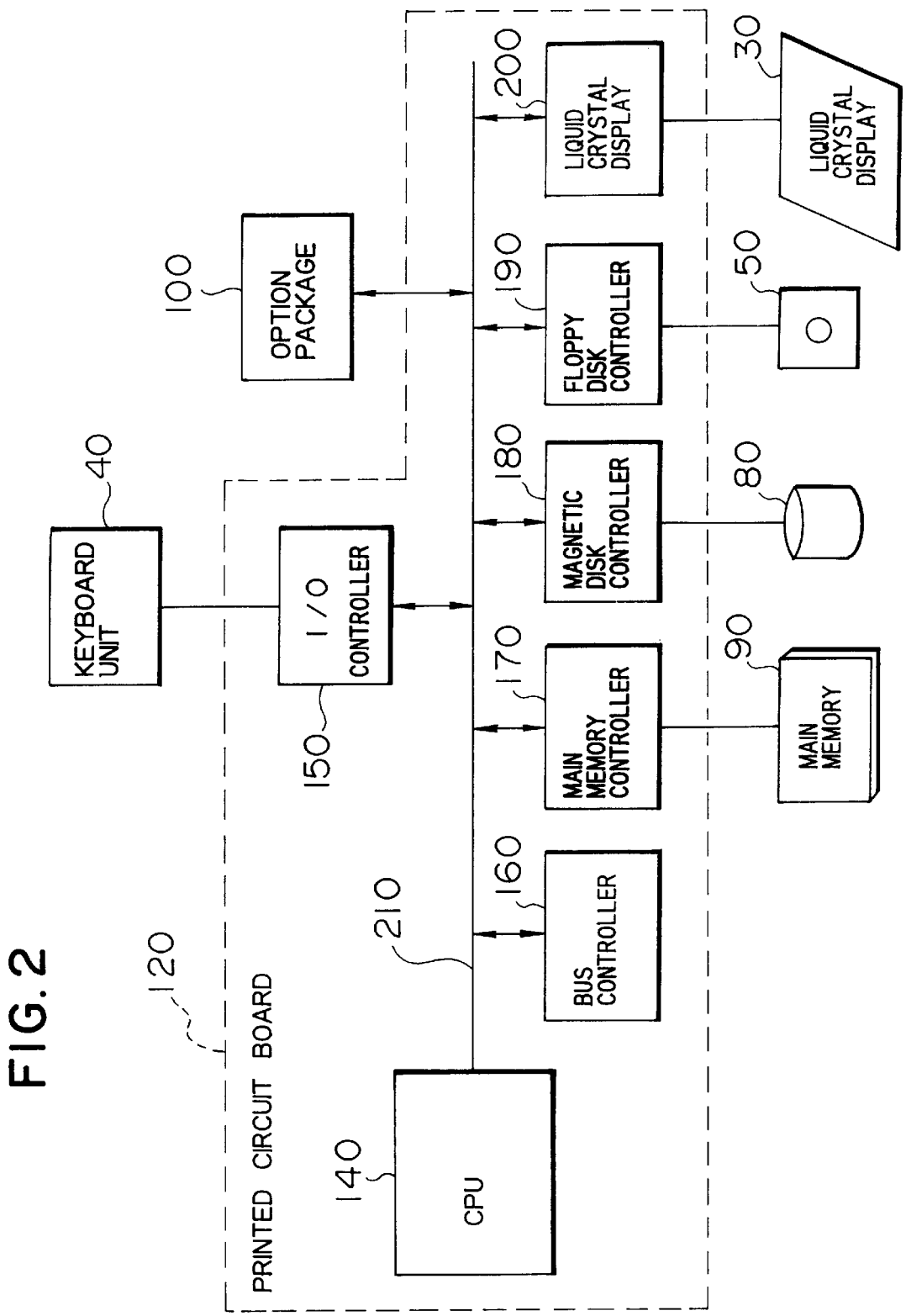
FIG. 2 is a block diagram showing the internal construction of the processing apparatus.

FIG. 2 is a block diagram showing the internal construction of the apparatus. The internal construction of the information processing apparatus of the present embodiment is similar to that of a general information processing apparatus.

A printed circuit board 120 having semi-conductor parts such as CPU and so on mounted thereon includes a central processing unit 140. The printed circuit board 120 further includes an I/O controller 150 for controlling serial/parallel interfaces (printer, communication and LAN), a keyboard, a bus controller 150, a main memory controller 170 for controlling the read from and write into a main memory, a magnetic disk controller 180, a floppy disk controller 190 and a display controller 200.

The central processing unit 140 sends and receives various signals to and from the above-mentioned components through a system bus 210 to make a control for the liquid crystal display 30, the floppy disk 50, a 3.5 inch hard disk 80, an expansion memory 90 and an option package 100, the read of data, and so on. The option package 100 is provided for contemplating the expansion or enhancement of the function which includes the connection to a network or a host computer.

Next, the internal packaging structure of the body 10 in the equipment casing will be explained together with design philosophy. The internal packaging structure as a whole is shown in FIGS. 3A to 3C.

In the present embodiment, the packaging of the interior of the body case is made especially from three aspects which will be mentioned in the following.

(1) Weight Distribution (or Balance) and Compact Packaging

FIG. 4 shows the arrangement of a power source unit 110 and so on which are provided on the back side of the body 10, and the printed circuit board 120 having electronic/semiconductor parts mounted thereon is disposed on a bottom surface of the casing. In this case, the printed circuit board 120 is disposed parallel to a surface of the casing which is to be mounted on a desk.

The hard disk 80, the floppy disk 50 and the power supply unit 110, which occupy the most of the weight of the present equipment, are arranged at the rear or back surface portion of the body case, and the hard disk 80 and the floppy disk 50 are placed at positions lower than the power supply unit 110. In this case, the hard disk 80 is positioned on the left side of the back surface portion of the casing and the floppy disk 50 is positioned on the right side of the back surface portion of the casing. The reason why the floppy disk 50 is on the right side, is that many men and women are right-handed.

Also, a heat discharging fan 130 is disposed at a side surface of the casing and on one side of the power supply unit 110. Further, the option package 100 is attached parallel to the printed circuit board 120 and in a space under the hard disk 80 and the floppy disk 50.

An SIMM board for the expansion memory 90 is attached in front of the hard disk 80 and the option package 100 and perpendicularly to the printed circuit board 120. Accordingly, there is no fear that the hard disk 80 and so on becomes an obstacle when the expansion memory 90 is attached. Alternatively, the SIMM board may be disposed at a certain angle, for example, at 45° in order to facilitate the setting into and removal from the SIMM inserting portion 70 as will be mentioned later on.

With the above-mentioned arrangement, the weight of the equipment is balanced in right and left and is balanced in front and back when the display unit 20 is made stand. Thereby, it becomes possible to install the equipment stably, notwithstanding that the body 10 has a small placing area or is of a space-saving type. Also, the workability upon attachment of the expansion memory 90 is satisfactory.

Figure 5:
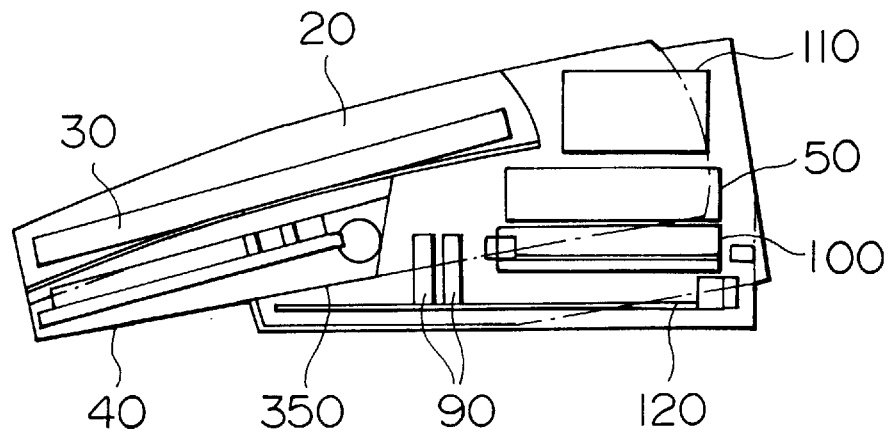
FIG. 5 is a perspective side view of the processing apparatus.

FIG. 5 is a perspective view of the equipment when the body 10 is seen from its side face. When the equipment is not used, the keyboard unit 40 can be integrated with the body 10 by placing the keyboard unit 40 on the keyboard/body fixing step 350 and closing the display unit 20. Therefore, this structure is handy to carry. Especially, in regard to the keyboard 40, this effect is great since it is detachable from the body 10. Also, in the present embodiment, in a state in which the display unit 20 is closed, the keyboard unit 40 is sandwiched between the display unit 20 and the keyboard/body fixing step 350. Therefore, the keyboard unit 40 is prevented from coming off and down when the apparatus is carried. Namely, the apparatus is excellent in safety.

Further, the apparatus is designed such that the ends of the display unit 20 and the keyboard unit 40 coincide with each other at the time of non-operation, thereby providing a beautiful and high-grade sight of the equipment.

(2) High-Efficiency Cooling

Figure 6:
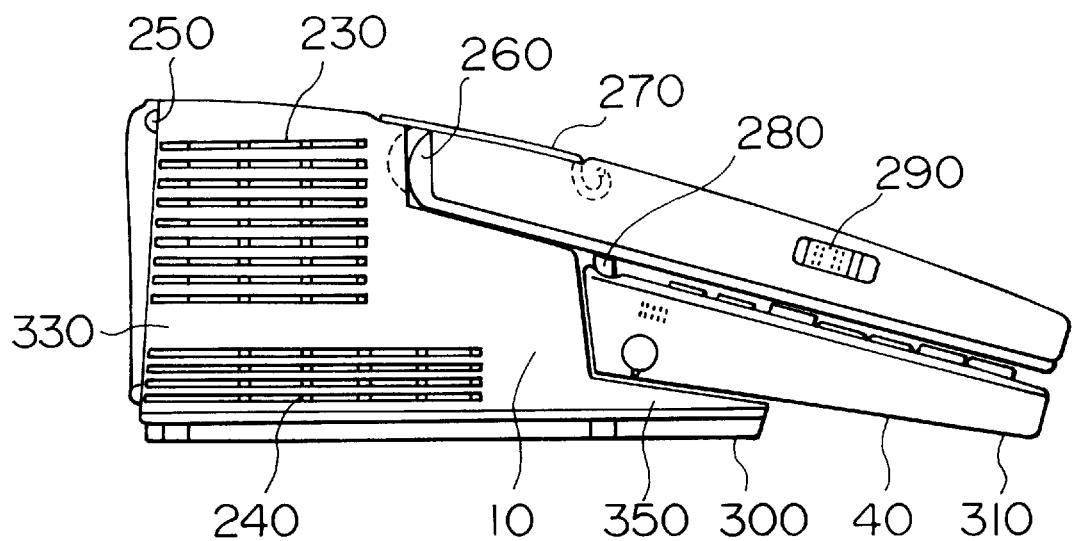
FIG. 6 is a side view of the processing apparatus.

FIG. 6 is an external side view of the apparatus casing. The apparatus has a size of 126 mm in height of the back portion of the body, 340 mm in depth and 47 mm in height of the front portion of the body and is designed with roundness.

Reference numeral 230 designates an air outlet for discharging the air from the heat discharging fan 130, numeral 240 an air inlet for taking in an cooling air from the exterior of the casing to cool the interior of the casing, numeral 250 legs provided on the rear surface portion of the casing, numeral 260 a hinge member for connecting the display unit 20 and the body 10, numeral 270 a sliding-type casing cover which slides in accordance with an opening/closing pivotal movement of the display unit 20 to cover and protect the hinge member 260, numeral 280 a keyboard fixation release button for releasing the keyboard unit 40 from a connection thereof with the body 10, numeral 290 a display lock release button for releasing the display unit 20 from a connection thereof with the keyboard unit 40, numeral 300 a bottom surface of the frame, and numeral 310 a keyboard non-slip for preventing the keyboard unit 40 from slipping, thereby stabilizing a bottom surface of the apparatus.

Generally, in a small-size information processing apparatus which realizes the improvement of speed and function of a processing by use of semi-conductor parts such as CPU, a large amount of heat is generated from the power supply unit 110 and a printed circuit board having the semiconductor parts mounted thereon. Therefore, the heat discharging fan 130 and the cooling air intake 240 are indispensable.

In the apparatus of the present embodiment, the air intake 240 is provided at a lower portion of a side surface of the casing in order to improve the cooling efficiency. In consideration of the strength of the casing, the air intake 240 is assembled into a form of mesh type. The height of the air intake 240 is not smaller than the sum of the total thickness of the printed circuit board 120 and the option package 100 and the height of semiconductor parts and electronic parts mounted on the printed circuit board 120. The width of the air intake 240 utilizes the depth of the body 10 to the greatest.

The heat discharging fan 230 is disposed at an upper portion of the side surface of the casing. An air flow path is formed such that the cooling air passes between the power supply unit 110 and the printed circuit board 120 from which a large amount of heat is generated. This air flow path is formed by the floppy disk 50 and the hard disk 80 from which a less amount of heat is generated. The air flow path guides the cooling air from the printed circuit board side to the power supply unit side.

The air outlet 230 is defined depending upon the size of the heat discharging fan 130. The air outlet 230 is assemble into a form of the mesh type in order to discharge the air with a high efficiency so that the heated air to be discharged does not return into the casing, in order to prevent dust or alien substances from entering from the exterior and in order to prevent noises such a noisy sound of the air current of the air discharging fan 130.

Though no detailed explanation is made, a flexible printed circuit board (FPC) is used for the connection between the printed circuit board 120 and each of the units constituting the apparatus, thereby contemplating a small-size apparatus and the insurance of a pass space of the cooling air.

Figure 7:
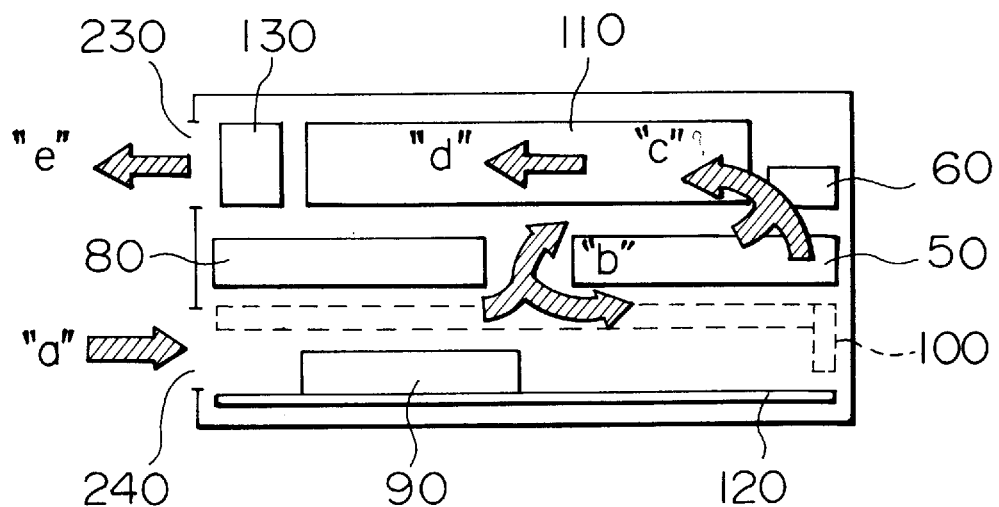
FIG. 7 is a perspective front view showing the flow of a cooling air in the body of the processing apparatus.
Figure 8:
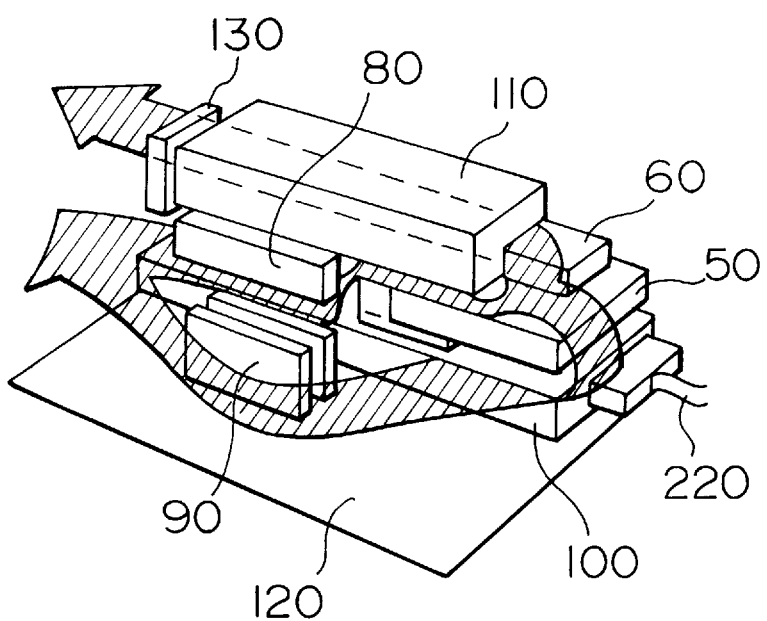
FIG. 8 is a perspective view showing the flow of the cooling air in the body of the processing apparatus.

An air flow realized by the above construction will now be explained by use of FIGS. 7 and 8.

A part of a cool air led from the air intake 240 passes along a flow path formed by the option package 100, the hard disk 80 and the floppy disk 50 and then reaches the right side of the interior of the casing. The remaining part of the air passes on the lower side of the option package 100 and by the expansion memory 90 to thereby cool the expansion memory 90 and the printed circuit board 120. Since the floppy disk 240 and the hard disk 80 are arranged between the air intake 240 and the air outlet 230, it is possible to prevent the air from escaping from the air intake 240 to the air outlet 230 directly.

The air having reached the right side of the interior of the body 10 is turned up so that it goes through the interior of the power supply unit 110 and the periphery thereof and outgoes from the air outlet 230. In connection therewith, the power supply unit 110, which is the greatest heat generating source, is arranged in the vicinity of the air outlet 230, and the heat discharging fan 130 is arranged just on the side of the power supply unit 110. Therefore, a heat generated from the power supply unit 110 can be prevented from expanding in the casing, thereby rapidly discharging the heat.

As mentioned above, the parts having a large amount of heat generated therefrom are preponderantly cooled. Accordingly, the balance of cooling in the apparatus is kept between the parts having a large amount of heat generated therefrom and the parts having a less amount of heat generated therefrom. As a result, it is possible to cool the whole of the apparatus with a high efficiency.

The above arrangement not only enables the high-efficiency cooling but also improves the packaging density, thereby realizing a small-size apparatus which has a width of 390 mm, a depth of 340 mm and a height of 126 mm.

(3) Office Environments and Safety

Figure 9A:
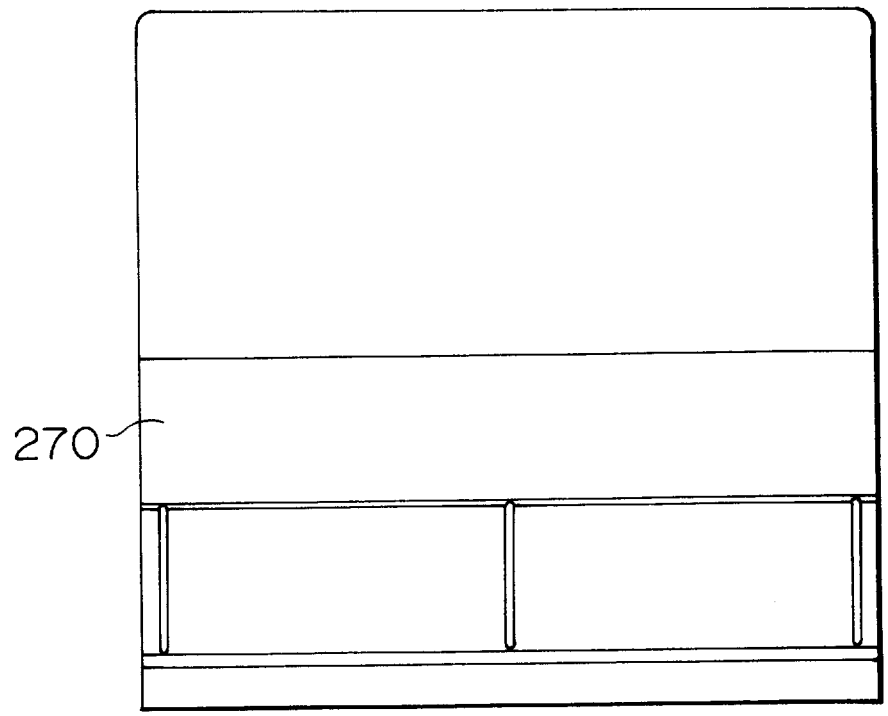
FIGS. 9A and 9B are external top and rear views of the processing apparatus.
Figure 9B:
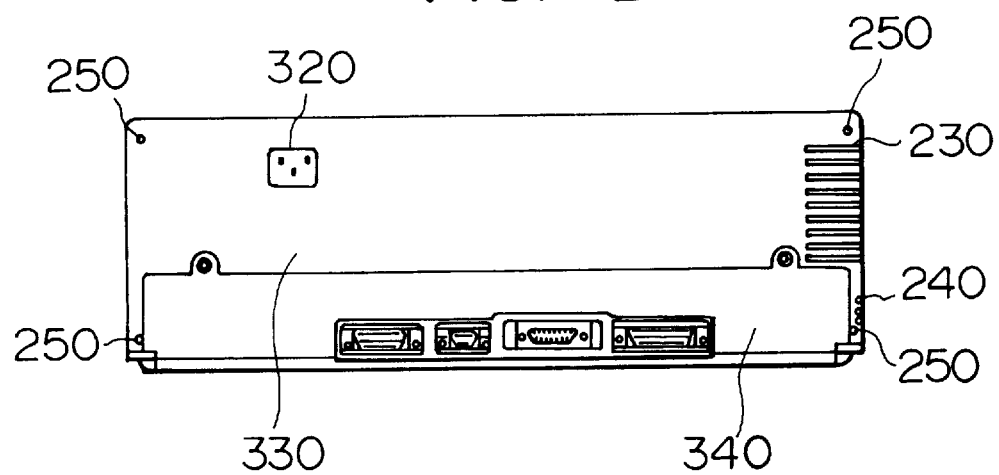

FIGS. 9A and 9B show external top and rear views of the apparatus, respectively. A width of the apparatus is 390 mm. Reference numeral 320 designates a power plug, numeral 330 a back portion of the casing, and numeral 340 an option package insertion port cover.

Various I/O devices are connected to a cable at the back portion 330 of the casing. Therefore, it becomes possible to ensure a space in front of the apparatus and on the side the apparatus and to eliminate uncomfortableness caused by a visual hindrance.

An option package insertion port is provided at the back portion of the casing. Therefore, an expanded capability or the enhancement of a function can be attained easily by taking off the option package insertion port cover 340 and inserting the option package 100.

If a groove for guiding the option package 100 is provided in the option package insertion port, the connection to the printed circuit board 120 is facilitated. Thereby, it becomes easy to deal with the maintenance of the option package 100.

Since a power cord is positioned at the back portion 330 of the casing, a horizontal type connector is used.

Figure 10:
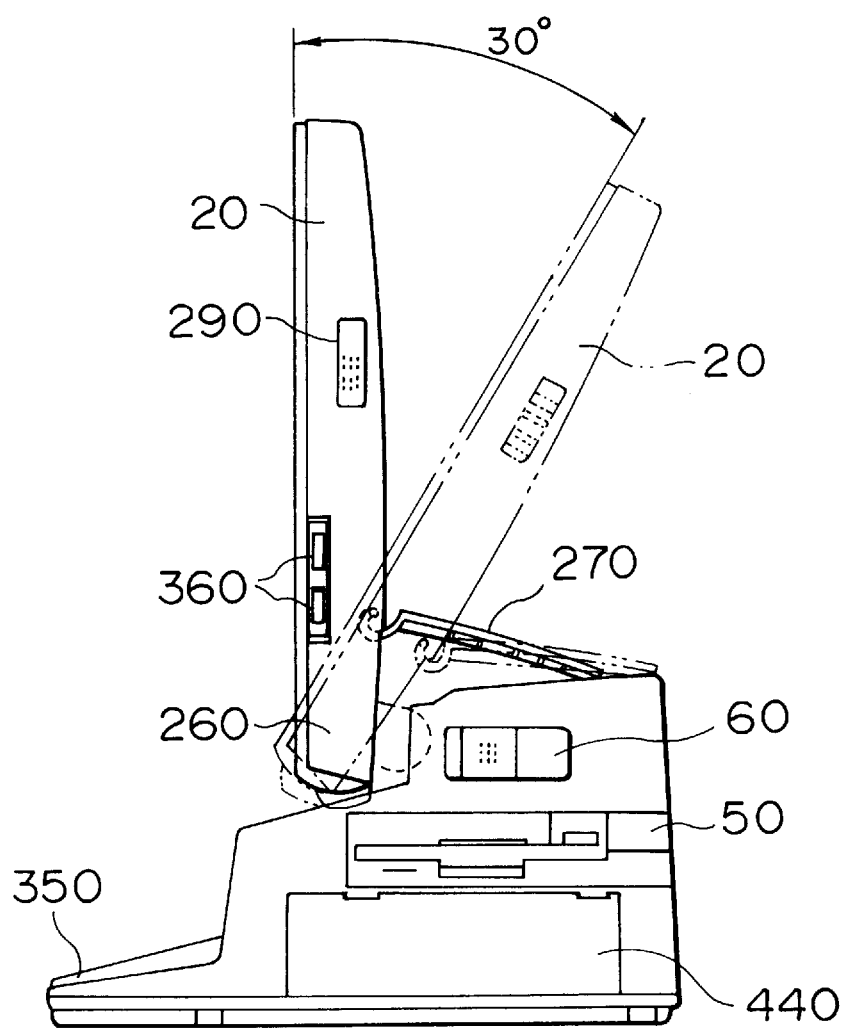
FIG. 10 is an external side view of the processing apparatus.

FIG. 10 is an external side view of the apparatus in a state in which the display unit 20 is opened. In FIG. 10, reference numeral 360 designates a liquid crystal control volume for controlling the brightness, contrast, etc. of a liquid crystal. Numeral 440 a cover for an option package/cable connection portion where a network cable is connected to the option package 100 to be mounted from the back portion of the casing. Numeral 290 designates a display lock release button for releasing the display unit 20 from a connection thereof with the keyboard unit 40.

A depth of the body 10 is 230 mm, and an inclination angle of the display unit 20 is 30° at the largest.

It is of course that the cover 440 for option package/cable connection portion is removable. If the option package 100 having an expanded function as required is beforehand mounted in the body 10, it is possible to connect a cable to the option package 100, as required, by taking off the cover 440.

The keyboard fixing step 350 is provided with an inclined surface so that the keyboard unit 40 is inclined at 140 when the keyboard unit 40 is mounted. Thereby, an operability with an excellent human interface is obtained even in the case where the equipment is used with the keyboard being fixed to the body 10.

The sliding-type casing cover 270 slides in accordance with an opening/closing movement of the display unit 20. In other words, the sliding-type casing cover 270 has not only a function of protecting the hinge portion 260 but also a function of supporting the display unit 20.

The display lock release button 290 is a sliding button for effecting the taking-in/taking-out of a display locking hook 370 which will be mentioned later on.

Figure 11:
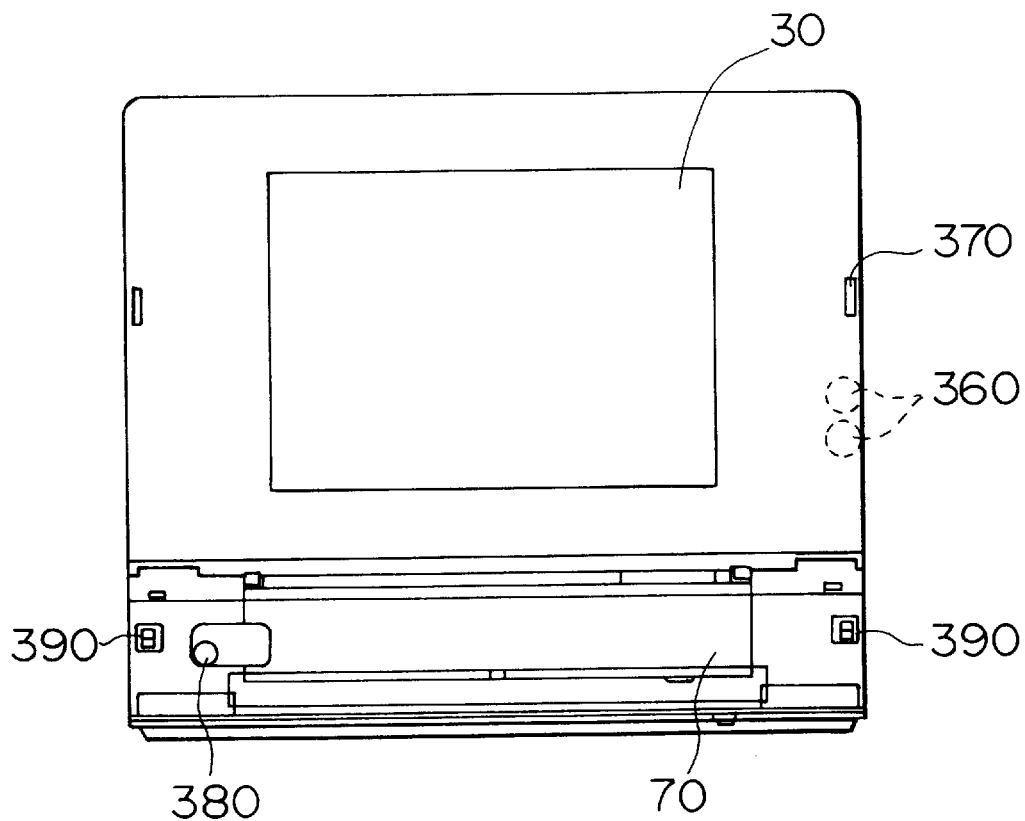
FIG. 11 is an external front view showing a state of the processing apparatus in which a display unit is opened.

FIG. 11 is an external front view of the apparatus casing in a state in which the display unit 20 is opened. When the display unit 20 is vertical to an installation surface, the apparatus has a height of 331.15 mm.

In FIG. 11, reference numeral 360 designates the liquid crystal control volume, numeral 370 the display locking hook, numeral 380 a keyboard I/F portion, and numeral 390 a keyboard locking mechanism.

The liquid crystal control volume 360 for adjusting the contrast and brightness of a liquid crystal display is incorporated in the display unit 20. Therefore, there is an effect of preventing a visual hindrance which gives uncomfortableness to a user, and a beautiful and high-grade sight is obtained. A cover for the display unit 20 is provided with a recess adapted to the size of the liquid crystal control volume 360 to facilitate the operation of the liquid crystal control volume 360 by fingers.

The display locking hook 370 can be accommodated in the display unit 20 by the display lock release button 290. Thereby, the surface of the display unit 20 becomes flat at the time of use of the apparatus with the result that a visual hindrance can be reduced. The display locking hook 370 has the form of a key by which cloths or the like may easily be caught. If the cloths or the like are caught by the hook 370, there is a large possibility that the apparatus falls. However, in the present embodiment, since there is employed a structure in which the display locking hook 370 can be accommodated, the safety of the apparatus can be ensured.

The expansion memory can easily be mounted by taking off a cover of the SIMM insertion portion 70. The cover of the SIMM insertion portion 70 takes a form which includes a part of the front surface portion of the body 10 and a part of a front portion of the upper surface of the body 10, that is, an inverted image of L character form so that both spaces in the front and in an upper portion of the front are ensured, thereby facilitating a mounting work.

Also, since the height of the back portion of the casing is ensured by arranging the units at the back portion of the apparatus in a piled-up manner, it is possible to mount the SIMM in either a vertical or oblique direction, thereby facilitating a maintenance work.

The keyboard I/F portion 380 arranged on the left side of the front surface of the body 10 has a structure in which a horizontal-type keyboard connector can be accommodated, thereby facilitating the connection of the keyboard unit 40 to the body 10.

Figures 12A, 12B:
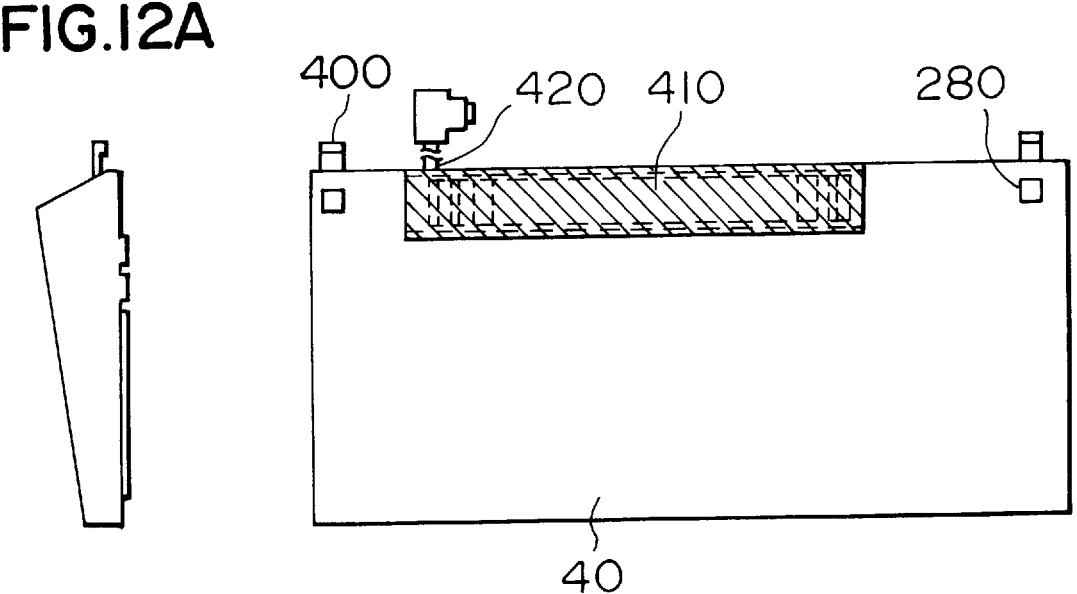
FIGS. 12A and 12B are external rear and top views of a keyboard unit.

FIGS. 12A and 12B are side and top views of the keyboard, respectively. The width of the keyboard unit 40 is the same as that of the body 10. The height of the front of the keyboard unit 40 is 19.5 mm and the height of the rear thereof is 43 mm.

In FIG. 12B, reference numeral 400 designates a keyboard locking hook and numeral 410 designates a curl cord receiving area.

Figure 13:
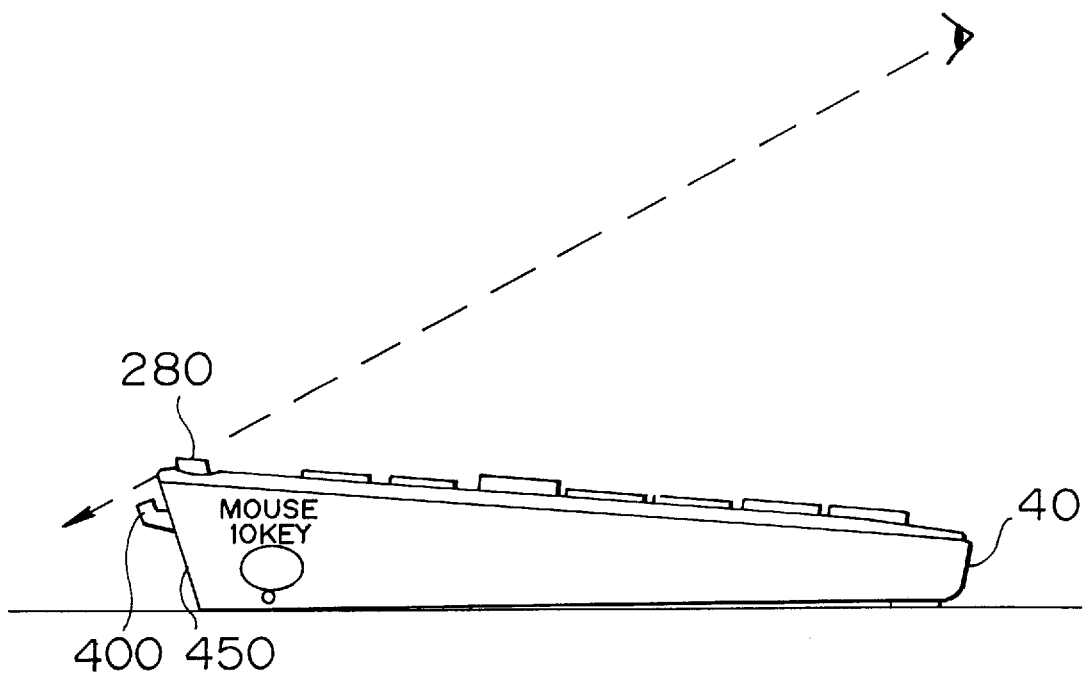
FIG. 13 is a view for explaining a state of the keyboard unit in which a visual hindrance is reduced.

The keyboard unit 40 in the present embodiment has an external form which is made thin on the front face side and thick on the back face side so as to provide an inclined key surface, thereby improving a key depression operability. Also, a back surface 450 of the keyboard unit 40 is provided with an inclination so that the keyboard locking hook 400 becomes invisible to an operator, as shown in FIG. 13, thereby eliminating a visual hindrance.

The diameter of a curled form of a curl cord for connecting the keyboard unit 40 and the body 10 is made smaller than the thickness of the keyboard unit 40. A curl cord connection portion of the keyboard unit 40 is located in the curl code receiving area 410 and on the right side thereof. Therefore, when the keyboard unit 40 is moved along the keyboard fixing step 350 so that the keyboard locking hook 400 is inserted into the keyboard locking mechanism 390, the curl cord is naturally or automatically received into the curl cord receiving area 410. Accordingly, it is not necessary to preliminarily accommodate the curl cord and the fixedly mounting keyboard unit 40 is facilitated.

A relationship in lateral position between the keyboard I/F portion 380 of the body 10 and the curl cord connection portion of the keyboard unit 40 may be reversed.

Figure 14:
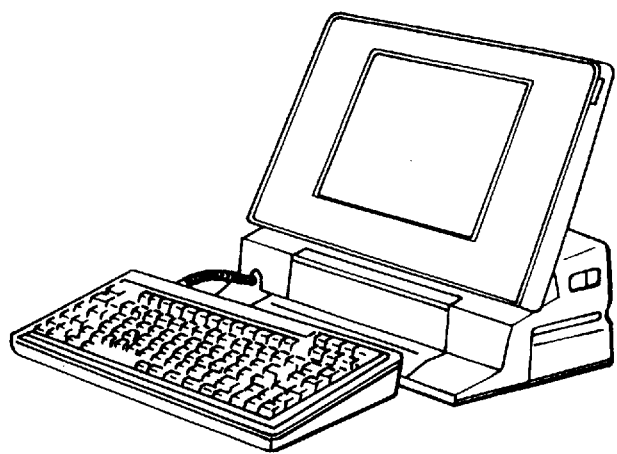
FIG. 14 is a perspective view showing a state of the processing apparatus in which the keyboard unit is detached from the body.
Figure 15:
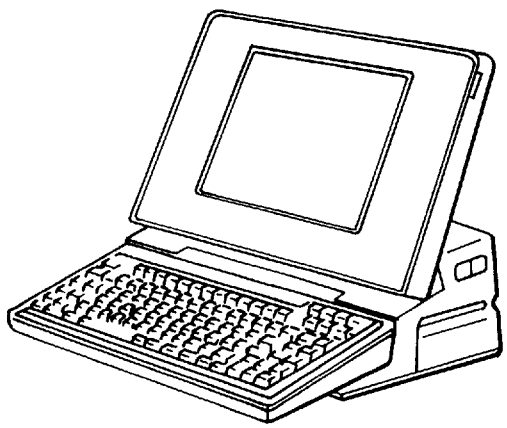
FIG. 15 is a perspective view showing a state of the processing apparatus in which the keyboard unit is coupled to the body.

FIG. 14 shows a state of the apparatus in the case where the keyboard is used in a manner detached from the body 10, and FIG. 15 shows a state of the apparatus in the case where the keyboard is used without being detached from the body 10. Thus, in the equipment of the present embodiment, the keyboard can be operated in either a detached or non-detached manner by a user's choice.

Figure 16:
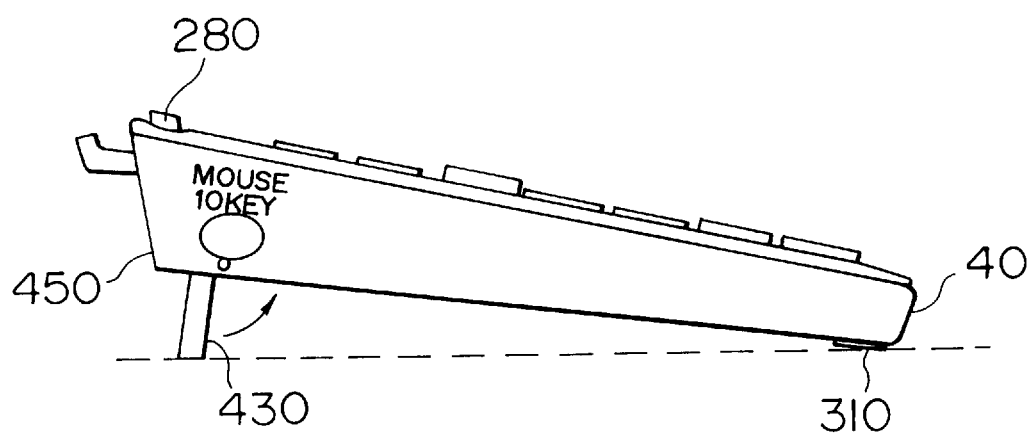
FIG. 16 is a view for explaining a state of the keyboard unit in which a keyboard stand is raised.

Further, the keyboard unit 40 has a keyboard stand 430 on a bottom surface of the keyboard unit 40 and on the back side of the bottom surface, as shown in FIG. 16. The keyboard stand 430 is constructed to be pivotable in a forward/backward direction about a joint between the keyboard stand 430 and the keyboard unit 40. By leveling the keyboard stand 430 to the front side of the keyboard unit, it is possible to take in the keyboard stand 430 in a state in which it extends along the bottom surface of the keyboard unit. In the case where the keyboard stand 430 is raised, a larger inclination can be obtained by a user's choice when the keyboard is used in a detachable manner.

In the case where the keyboard unit 40 is to be connected to the body 10, the keyboard 430 is automatically taken in by placing the back portion of the bottom surface of the keyboard unit 40 on the keyboard fixing step 350 and sliding it toward the body 10 as it is. Accordingly, the handling is easy.

As mentioned above, the keyboard unit 40 can easily be mounted by placing the keyboard unit 40 on the keyboard/body fixing step 350 and pushing or sliding the keyboard unit 40 toward the body 10 so that the keyboard locking hook 400 is inserted into the keyboard locking mechanism 390. On the other hand, the keyboard unit 40 can easily be detached from the body 10 by pushing the keyboard fixation release button 280 to draw out the keyboard unit 40.

The keyboard fixation release button 280 is arranged on the upper surface of the keyboard unit 40. Therefore, when the apparatus is carried, the keyboard fixation release button 280 is covered or hidden by the display unit 20 and hence there is no fear that the button 280 is erroneously pushed.

A mechanism for locking the keyboard unit 40 with respect to the body 10 may be provided on the keyboard/body fixing step 350. If both such a locking mechanism and the locking mechanism 390 shown in FIG. 11 are provided, it is possible to hold the keyboard unit 40 more securely.

Figure 17:
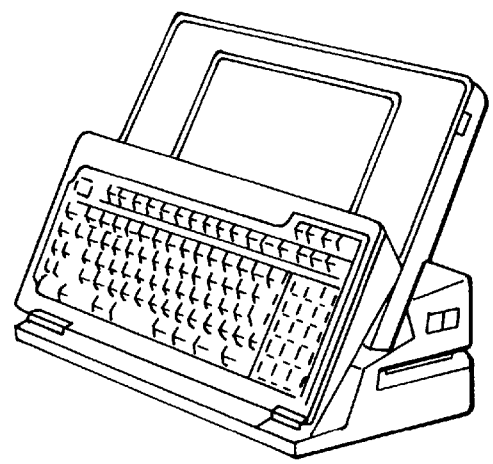
FIG. 17 is a perspective view showing a state of the processing apparatus in which the keyboard unit is accommodated.

FIG. 17 shows a state of the apparatus in the case where the apparatus is not used temporarily.

In the apparatus of the present embodiment, it is possible to temporarily hold or rest the keyboard unit 40 in front of the body 10 and the display unit 20 in such a manner that the keyboard unit 40 is placed on the keyboard/body fixing step 350 with the keyboard unit 40 being made stand. In this case, the keyboard unit 40 does not hide the whole of the display unit 20. Therefore, it is possible to protect a display screen of the display unit 20 on one hand and to confirm the state of execution of a processing on the other hand. Also, even in the case where a user is apart from the desk because of a large amount of calculation and a long processing time required or in the case where the brightness of the display is lowered in a power-saving mode, a third person can confirm a condition of the apparatus under working, thereby making it possible to prevent an erroneous operation such as the stoppage or cancellation from being performed.

Means for resting the keyboard unit in this case is not limited. For example, a stepped uneven portion or a groove for resting the keyboard unit 40 may be provided on an upper surface of the keyboard/body fixing step 350. Also, a resting portion capable of resting the keyboard unit 40 without making the keyboard unit 40 stand against the body 10 or the display unit 20 may be provided. In that case, however, the effect of protection of the display unit 20 is small.

Figure 18:
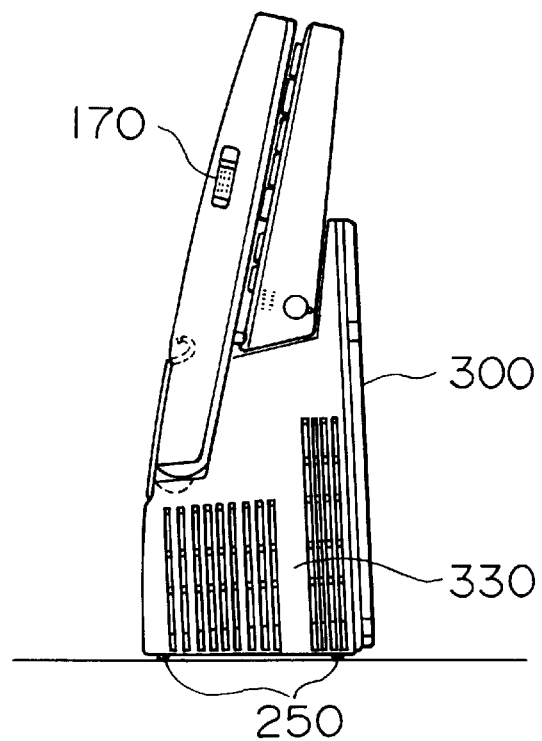
FIG. 18 is a side view showing a state of the processing apparatus in which the apparatus is made stand with a back surface of the apparatus being used as a placing surface.

FIG. 18 shows a state of the apparatus in the case where the apparatus is not used.

The present embodiment is constructed such that when the apparatus is not used, the back portion 330 of the casing can serve as a placing surface. For that purpose, legs 250 are provided on the back portion 330 of the casing to stabilize the apparatus. An occupation space of the apparatus on the desk, when the apparatus is not used, is only the area of the back surface of the casing, thereby attaining the space saving.

Next, explanation will be made of an example in which the transfer of the space-saving information processing apparatus is facilitated.

The construction of the present example is basically the same as that of the above embodiment, but is characterized in that a hand hold used in transferring the apparatus on a desk is provided.

Figure 19:
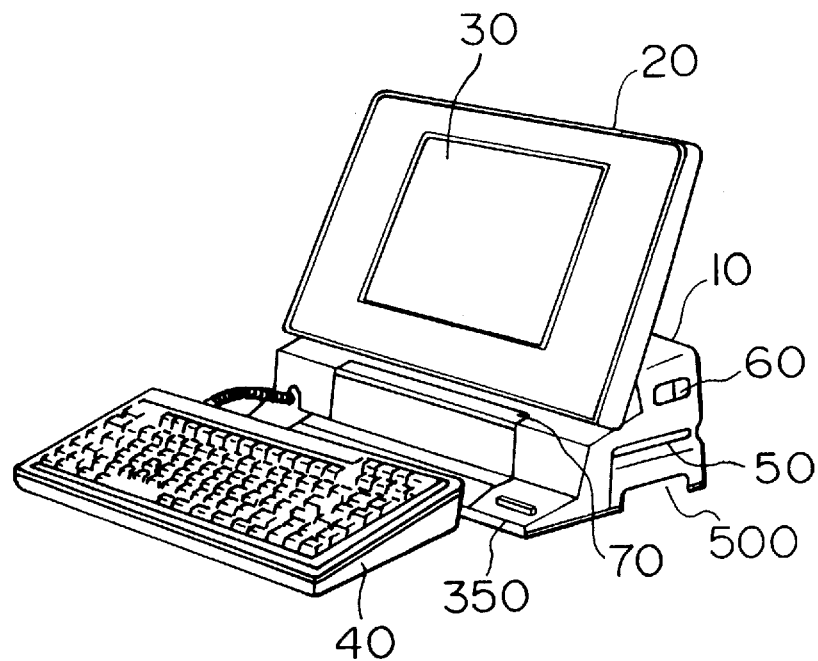
FIG. 19 is a perspective view showing another example of the processing apparatus.

In the present example, a hollow 500 large enough for a hand to go in is provided as the hand hold at the bottom of each of the right and left side surfaces of the body 10 and on the back side of the bottom, as shown in FIG. 19. With such a construction, it is possible to insert the hands into the hollows 500 when the apparatus is to be transferred. Thereby, the transfer of the apparatus is facilitated and there is no fear that the apparatus is let fall erroneously. Also, there is no inconvenience that the size of the apparatus becomes large.

Figure 20:
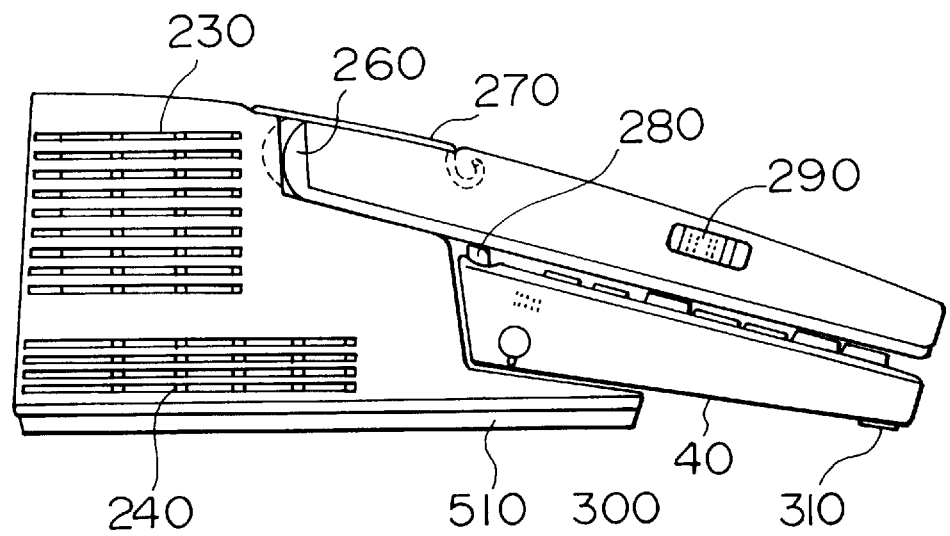
FIG. 20 is a side view showing an example in which a base is provided to the processing apparatus.
Figure 22A:
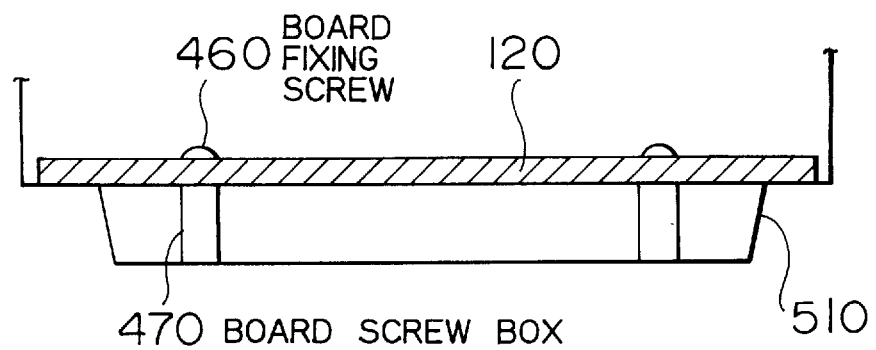
FIGS. 22A and 22B are views for explaining a mounting state of a printed circuit board.
Figure 22B:
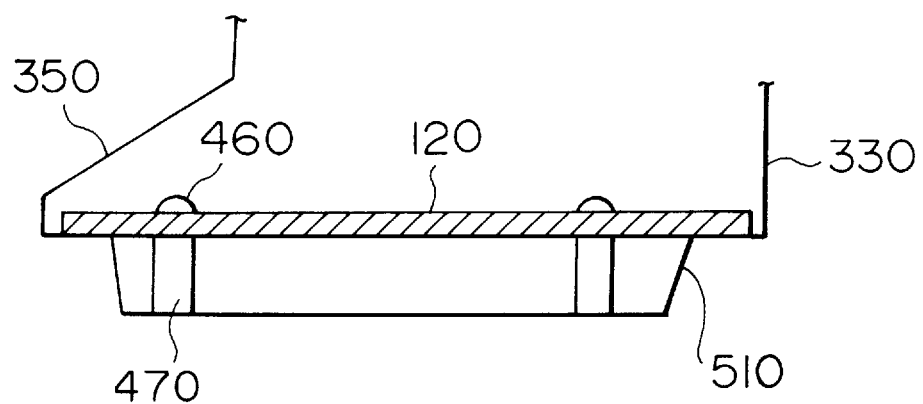

The hand hold is not limited to the hollows 500 shown in FIG. 19. For example, a similar effect can be obtained in such a manner that a base 510 for the apparatus casing having a placing area smaller than that of the body 10 is provided on the bottom side of the body 10 so that a space enough for hands to go in is ensured under the body, as shown in FIGS. 20, 21A and 21B. In this case, it is possible to insert the hands not only from the right and left sides but also from the front and back sides. No restriction is imposed on the size of the air outlet 230. In the case where a printed circuit board having the parts mounted on upper and lower surfaces thereof is used, an internal space of the base 510 can be used to ensure a space for the parts mounted on the lower surface of the printed circuit board. In this case, since the periphery of the printed circuit board 120 is supported by a marginal portion of the base 510, as shown in FIGS. 22A and 22B, the printed circuit board can be stabilized.

According to the first embodiment having been explained above, the following effects are obtained.

It is possible to make the size of an information processing equipment small, to improve the stability of the equipment in the case where the equipment is placed on a desk, and to realize a high-efficiency cooling.

In either the case where a keyboard is detachable from a body or the case where the keyboard is not detachable from the body, the operability is not deteriorated since the keyboard is provided with an inclination which is excellent in human interface.

A beautiful and high-grade sight can be obtained by eliminating visual hindrances. Also, an uncomfortableness caused by noises from a heat discharging fan can be eliminated.

When the apparatus is not used temporarily, the depth of the apparatus can be made smaller than an A-4 size file binder on a desk since the keyboard can be accommodated or taken in the body. Thereby, a space saving can be attained and an office environment can be used effectively.

Since a keyboard fixing step is provided at a front portion of the apparatus, the maximum area of a printed circuit board can be ensured and the enhancement of a function can be attained.

Since a front surface portion of the body is key-wise detachable, it is possible to facilitate a maintenance including the taking-out and putting-in of an SIMM.

The attachment/detachment of the keyboard is possible by one touch. Accordingly, the apparatus is contributable to the effective utilization of an office space and the provision of a comfortable office environment.

In the first embodiment disclosed above, the storages include one hard disk and one floppy disk. However, the kinds of the storage is not limited those disks. For example, an optical disk device can be used. Also, the number and arrangement of storages are not limited to those disclosed herein so long as a flow path similar to the above-mentioned flow path of a cooling air and a sufficient stability of the apparatus can be ensured.

Next, a space-saving information processing apparatus according to a second embodiment of the present invention will be explained by use of FIGS. 23 to 31.

Figure 23:
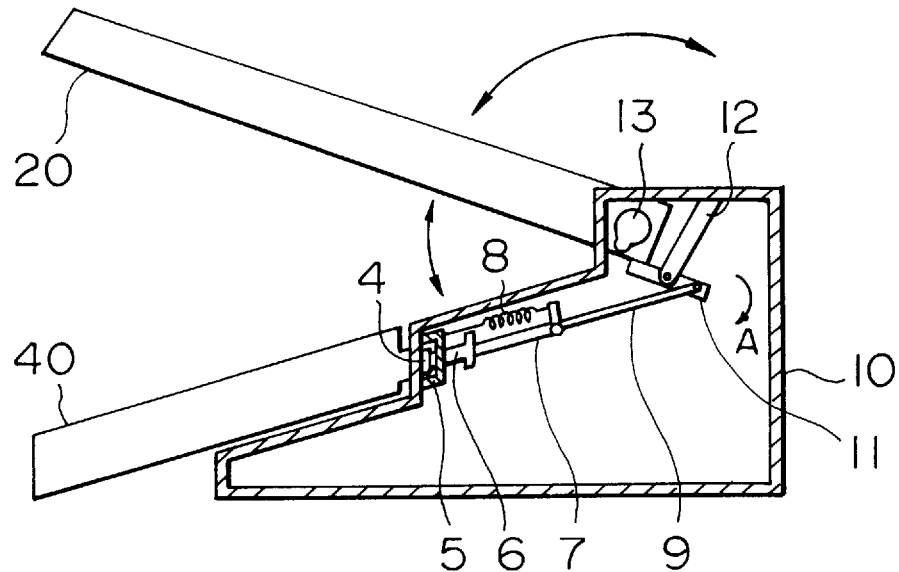
FIG. 23 is a perspective side view showing a space-saving information processing apparatus according to a second embodiment of the present invention.

FIG. 23 is a cross section showing the second embodiment of the present invention. In the figure, reference numeral designates a body, numeral 20 a display unit, numeral 40 a keyboard unit, numeral 4 a keyboard projection for connecting the keyboard unit 40 to the body 10, numeral 5 a body recess for receiving the keyboard projection 4, numeral 6 a detection button for detecting whether the keyboard unit 40 and the body 10 are connected or detached, numeral 7 an L-shaped rod for transferring the displacement of the detection button 6, numeral 8 a spring for energizing the detection button 6 connected to the L-shaped rod 7 in a direction of projection into the body recess 5, numeral 9 a rod for transferring the displacement of the L-shaped rod 7, numeral 11 a displacement conversion rod for converting a linear displacement of the rod 9 into a rotational displacement, numeral 12 a displacement conversion rod column for pivotally supporting the displacement conversion rod 11, and numeral 13 a pivotal rocking movement restricting or controlling member which is coupled or secured to a rotation axis of the display unit 20 so that it pivotally moves in accordance with the display unit 20. The rocking-movement restricting member 13 has a projection which is brought into engagement with an end portion of the displacement conversion rod 11 upon pivotal movement of the displacement conversion rod 11 to restrict or control the range of rocking movement of the display unit 20.

When the keyboard unit 40 and the body 10 are connected, as shown in FIG. 23, the keyboard projection 4 is inserted in the body recess 5 to push the detection button 6 into the interior of the body 10. The displacement conversion rod 11 is in a condition in which the end portion of the displacement conversion rod 11 and the projection of the rocking movement restricting member 13 do not engage with each other even if the display unit 20 is pivotally rocked. Therefore, it is possible to freely rock the display unit 20 in a range which-is determined from the point of view of the mounting structure of the display unit 20. More particularly, the range of rocking movement of the display unit 20 in this case is a range between a position pivotally moved backward from a vertical line by 35° or a state shown by a one-dotted chain line (c) in FIG. 25 and a position pivotally moved downward from a horizontal plane by 15° or a state shown by a one-dotted chain line (a) in FIG. 25.

Figure 24:
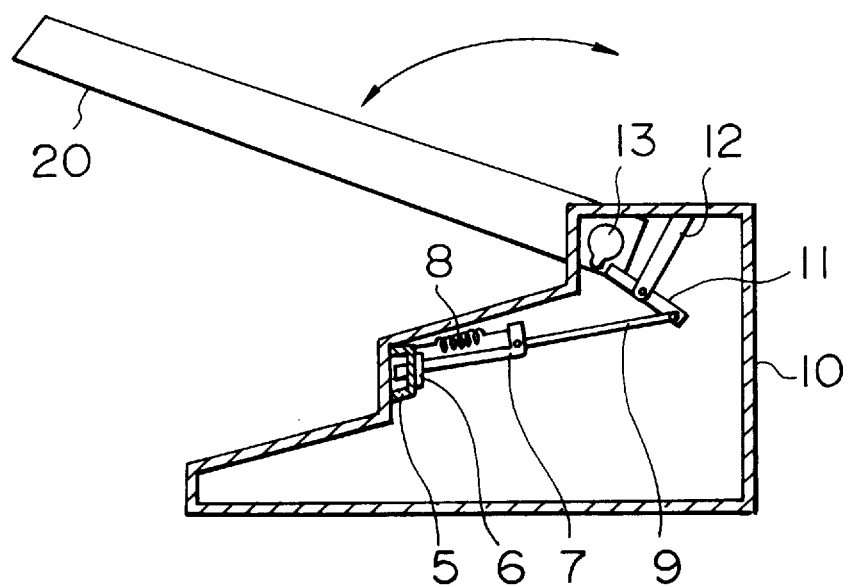
FIG. 24 is a perspective side view showing a state of the processing apparatus in which a keyboard unit is detached from a body.

When the keyboard unit 40 is detached from the body 10, as shown in FIG. 24, the keyboard projection 4 (see FIG. 23) comes out of the body recess 5 so that the detection button 6 protrudes into the body recess 5 by virtue of a force of the spring 8. A base or body portion of the detection button 6 is made larger than a protrusion end portion, thereof, an shown in FIGS. 23 and 24, so that the detection button 6 itself does not protrude. By the protrusion of the detection button 6, the L-shaped rod 7 and the rod 9 are displaced toward a left direction in FIG. 24. In response to this displacement, the displacement conversion rod 11 is pivotally moved rightward, as shown by arrow A in FIG. 23, so that the displacement conversion rod 11 is displaced into a position at which the end portion of the rod 11 is brought into engagement with the projection of the rocking movement restricting member 13. Therefore, even if a try to greatly rock the display unit 20 is made, the end portion of the displacement conversion rod 11 and the projection of the rocking movement restricting member 13 engage with each other and hence it becomes impossible to make a further rock of the display unit 20 beyond the engaging position. Namely, when the keyboard unit 40 is separated from the body 10, the range of rocking movement of the display unit 20 is restricted. More particularly, the range of rocking movement of the display unit 20 is restricted to a range between the position pivotally moved backward from the vertical line by 35° and a position displaced upward from the horizontal line by 200 or a state shown by a one-dotted line (b) in FIG. 25. In the state shown by the one-dotted line (b), a distance between a lower surface of the display unit 20 and a placing surface or a desk surface is about 135 mm.

Figure 26A:
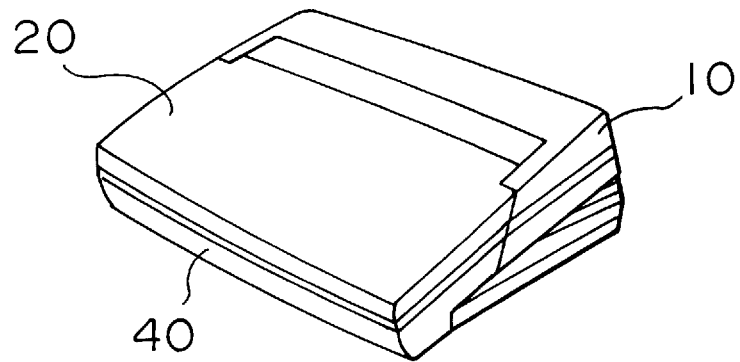
FIGS. 26A and 26B are perspective views showing the processing apparatus as a whole.
Figure 26B:
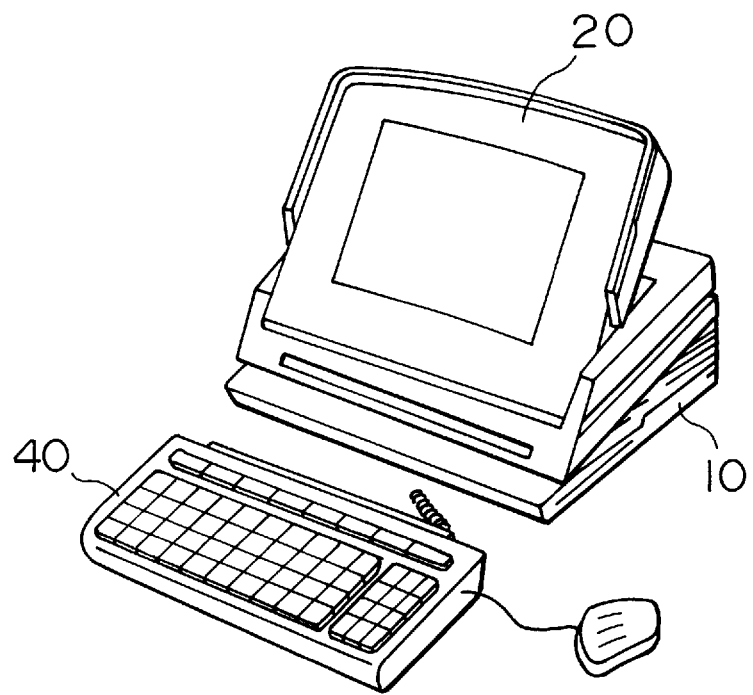

At the time of non-operation, the space-saving information processing apparatus of the present embodiment takes a state in which the body 10, the display unit 20 and the keyboard unit 40 are incorporated in one, as shown in FIG. 26A. When the apparatus is used, it is a general manner of use that the display unit 20 is opened and the keyboard unit 40 is taken out and is used or operated at a position where it is easy for a user to use the keyboard unit. Now consider the case where a try to close the display unit 20 is made when the apparatus is being used in such a manner. In this case, the rocking movement of the display unit 20 becomes impossible at a position of 135 mm from the placing surface. Therefore, even if any obstacle or alien body such as a coffee cup or a glass is placed in the immediate front of the display unit 20 or the body 10, the display unit 20 is prevented from coming into contact or abutment with the obstacle, thereby making it possible to prevent the display unit 20 from being damaged.

Figure 25:
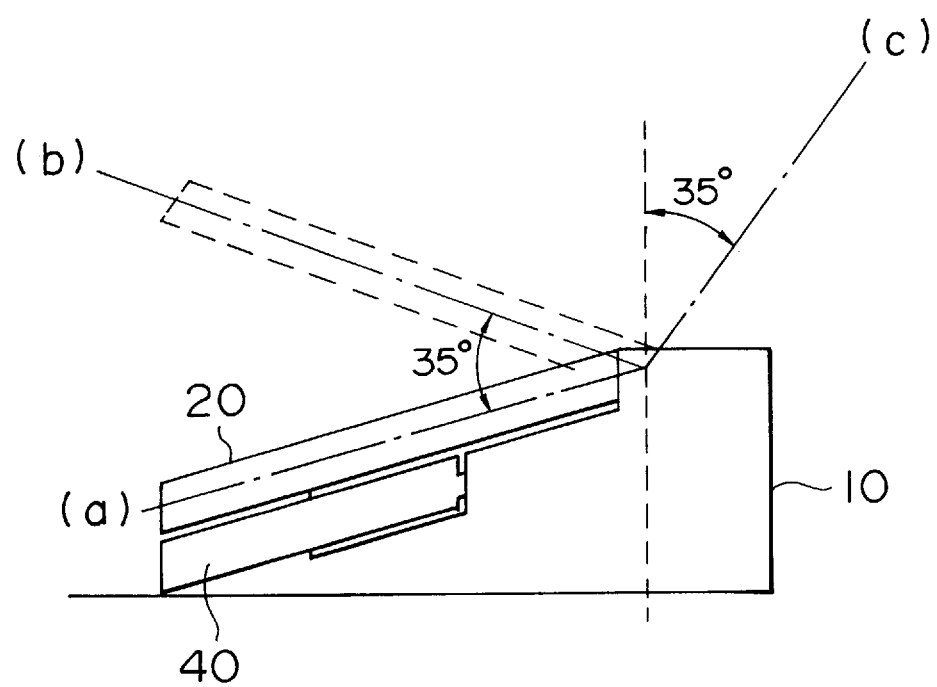
FIG. 25 is a view for explaining the angle of pivotal movement of a display unit.

Under a usual condition of use, no problem arises since the range of rocking movement of the display unit 20, in a state in which the keyboard unit 40 is detached from the body 10, is a range between the state shown by the one-dotted line (c) in FIG. 25 and the state shown by the one-dotted line (b) in FIG. 25. However, there may be considered the case where it is desired to use the display unit 20 in a range until the state (a) beyond the state (b). In such a case, the use of the display unit 20 in a range of rocking movement between the state (c) and the state (a) becomes possible to pushing the detection button 2 into the interior of the body 10 by a hand's finger tip or a slender member such as a ball-point pen to make a condition disguised as a connected condition of the keyboard unit 40.

In the present embodiment, the distance between the lower surface of the display unit 20 and the placing surface is selected to be about 135 mm. However, this distance may be about 100 mm. Also, in the present embodiment, the transfer of the displacement of the detection button 6 is made using the rods 7 and 9. However, it may be made using a wire. The button 6 is arranged not on an upper surface of the body 10, but at a position sequestered from a side surface of the body 10. This is important in that an erroneous operation is prevented.

In the present embodiment, the display unit 20 is locked and stopped at a position of 135 mm from the placing surface in order to protect the display unit 20 when the keyboard unit 40 is detached from the body 10. However, there is a possibility that a user trying to operate the apparatus for the first time without reading a manual tries to close the display unit 20 by dint of force with no understanding about the reason for the locking of the display unit 20, thereby destroying an opening/closing lock mechanism. A method of issuing an alarm sound upon locking may be considered in order to eliminate such a problem. A construction for realizing that method will now be explained by use of FIGS. 27 and 29.

Figure 27:
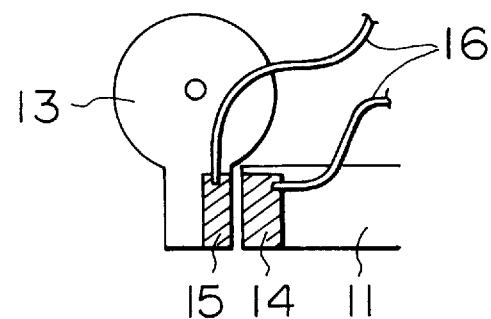
FIG. 27 is a view for explaining the construction of an example of a device for detecting the limit of pivotal movement of the display unit.
Figure 29:
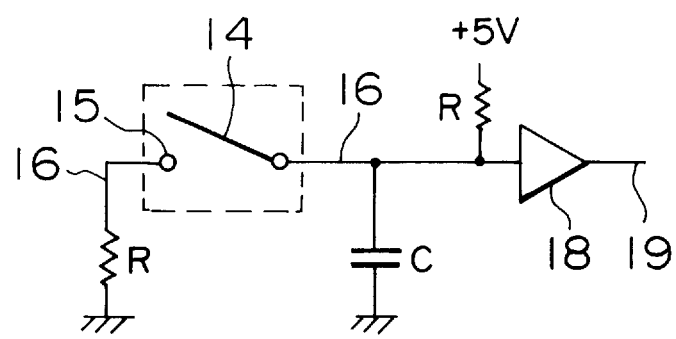
FIG. 29 is a circuit diagram of the detecting device shown in FIG. 27.

In FIGS. 27 and 29, reference numeral 14 designates a contact conductor provided at the end portion of the displacement conversion rod 11, numeral 15 a contact conductor provided at the projection of the rocking movement restricting member 13, numeral 16 a lead wire, numeral 18 a buffer, and numeral 19 an output of the buffer 18.

As the method of issuing an alarm sound can be considered a first method in which the issuance of the alarm sound is continued during the locked condition and a second method in which the alarm sound is issued for only a predetermined time after the locking. Some users may have a desire to use the apparatus in a state in which the display unit 20 is locked. When taking such a case into consideration, the second method is preferable. If the issuance of the alarm sound for only the predetermined time is realized by providing only means to transmit lock information instead of providing an exclusive timer, it becomes possible to use the parts commonly, thereby resulting in a small-size and low-cost apparatus. Thus, in an example shown in FIG. 29, the output 19 of the buffer 18 is connected to a port of the body 10 or an interrupt request line and a program is executed in which a locked condition of the display unit 20 is detected by a scan or interruption by the program and an alarm sound is issued for a predetermined time.

In the case where the display unit 20 is brought into the locked condition, it is necessary to issue an alarm sound even if a main power supply is turned off. In order to realize such a function, it is needless to say that a subsidiary power supply (or backup power supply) is required. In addition, it is preferable that the output 19 of the buffer 18 is connected to an interrupt request line for causing a state transition of a controller supplied with the subsidiary power supply from a low-power consuming state to a usual operating state.

Figure 28:
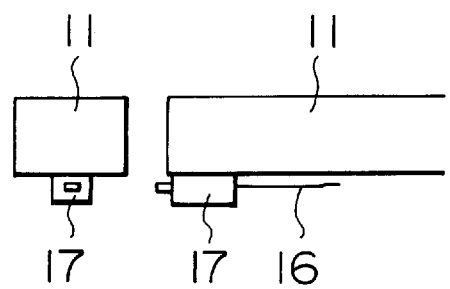
FIG. 28 is a view for explaining another example of the device for detecting the limit of pivotal movement of the display unit.

Though the contact conductors 15 and 16 are used to detect the locked condition, another means such as a microswitch 17 as shown in FIG. 28 may be used.

In the embodiment explained in conjunction with FIGS. 23 to 26, the locking of the display unit 20 is realized using the rods or wire. However, the present invention is not limited to such a locking method. An example, in which the display unit 20 is directly locked, will now be explained by use of FIGS. 30 and 31.

Figure 30:
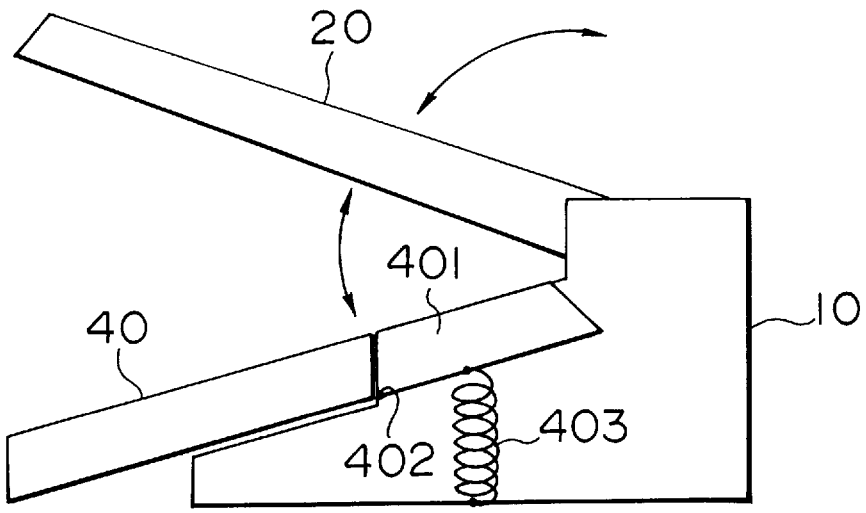
FIG. 30 is a side view showing another example of the processing apparatus.
Figure 31:
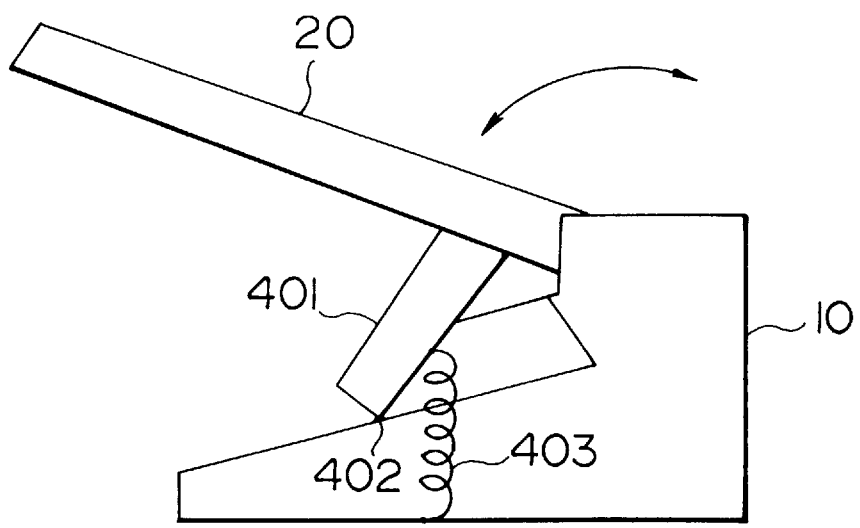
FIG. 31 is a side view showing the state of pivotal movement of a display unit.

In FIGS. 30 and 31, reference numeral 401 designates a pivotal rocking movement restricting member which is pivotally coupled to a body 10, numeral 402 a hinge which corresponds to a pivotal axis of the rocking movement restricting member 401, and numeral 403 a spring which pushes up the rocking movement restricting member 401 to a position at which the range of rocking movement of a display unit 20 can be restricted or controlled when a keyboard unit 40 is not mounted.

When the keyboard unit 40 is mounted on the body 10, the rocking movement restricting member 401 cannot make a rocking movement since the keyboard unit 40 is mounted, as shown in FIG. 30. Namely, the rocking movement restricting member 401 is not at a position where it can restrict the range of rocking movement of the display unit 20. Therefore, the range of rocking movement of the display unit 20 is not restricted.

When the keyboard unit 40 is detached from the body 10, the rocking movement restricting member 401 becomes rockable. The rocking movement restricting member 401 is pushed up by the spring 403 to a position at which the rocking movement restricting-member 401 can restrict the range of rocking movement of the display unit 20. In the shown example, means for detecting the detachment of the keyboard unit 40 from the body 10 is constructed by the rocking movement restricting member 401 the rocking movement of which is controlled by in accordance with the mounting/detachment of the keyboard unit 40, and means for restricting the range of rocking movement of the display unit 20 is constructed by the rocking movement restricting member 401, the hinge 402 and the spring 403.

When a keyboard unit is detachably used in a portable work station having a flat display panel, it is relatively difficult to draw the display panel or unit near an operator since the display unit is distant from the user. Also, if the user moves his or her head from a position, at which the operation is to be made, in order to draw the display unit near, an angle relative to the display unit is different immediately after the display unit has been drawn near and when the head takes the original position. Accordingly, there is a problem that it is difficult to obtain an optimal tilt or inclination angle of the display unit.

Since the above problem is involved, an example, in which a display unit is driven by an electric motor by an instruction from a keyboard unit or a mouse, will now be explained by use of FIGS. 32 to 36.

Figure 32:
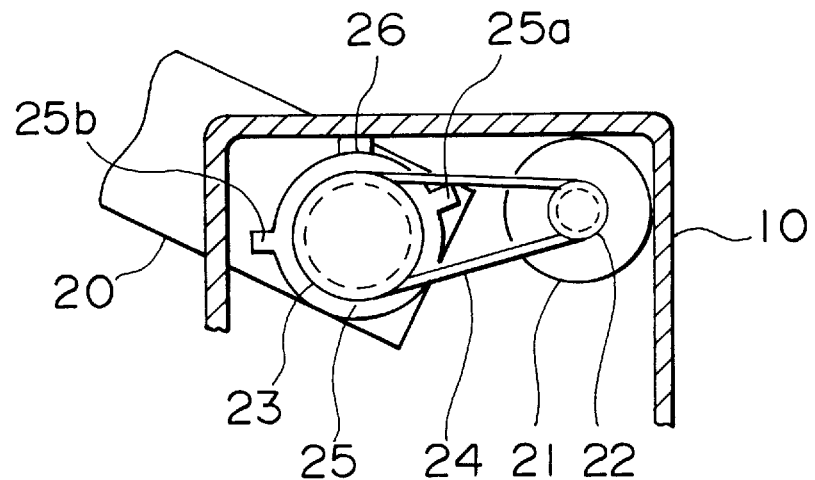
FIG. 32 is a view for explaining a device for pivotally moving the display unit.
Figure 33:
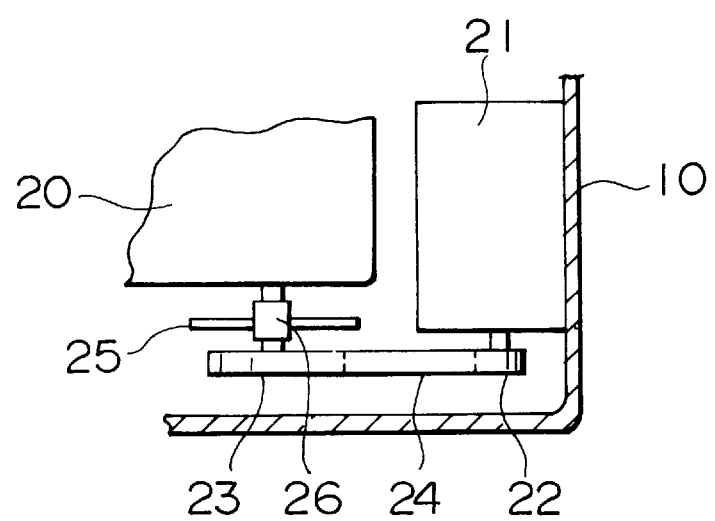
FIG. 33 is a top view of the device shown in FIG. 32.

In FIGS. 32 and 33, reference numeral 21 designates a stepping motor for pivotally rocking the display unit 20, numeral 22 a timing pulley provided to a rotation axis of the stepping motor 21, numeral 23 a timing pulley provided to a pivotal axis of the display unit 20, numeral 24 a timing belt put on the timing pulleys 22 and 23, numeral 25 a light shield plate holding disk, numeral 25a a light shield plate for lower limit for indicating the lower limit of a pivotal rocking movement of the display unit 20 when the keyboard unit 40 is detached from the body 10, numeral 25b a light shield plate for upper limit for indicating the upper limit of the pivotal rocking movement of the display panel 20, and numeral 26 a photo interrupter. In FIG. 34, reference numeral 27 designates a microswitch for detecting the detachment of the keyboard unit 40 from the body 10, and numeral 28 designates a memory in which various programs, in accordance with which a CPU 28a operates, are stored. In the memory 28 is stored a program which outputs a driving signal to the stepping motor 21 when a display unit control window as shown in FIG. 35A or 35B is developed on the display unit 20 in accordance with an instruction by the keyboard unit 40 or a mouse and an arrow shown in the window is designated by the keyboard unit 40 or the mouse. The stepping motor 21 operates through a stepping motor controller 21a and a motor driver 21b. FIGS. 35A and 35B show two kinds of display unit control window images. In FIGS. 35A and 35B, reference numeral 29 designates an outer frame of the window, numeral 31 a click region indicating that the display unit 20 should be closed, and numeral 32 a click region indicating that the display unit 20 should be opened.

Means such as gear connection (including worm gear) or direct connection other than the timing belt 24 shown in FIGS. 32 and 33 may be considered as means for connecting the rotation axis of the stepping motor 21 and the pivotal axis of the display unit 20. However, the timing belt is advantageous in order to reduce operation noises, in order to obtain a static torque enough to prevent the display unit 20 from falling down and in order to endure a bi-directional (forward/reverse) pivotal movement.

The static torque of the stepping motor 21 is sufficient to support the display unit 20 with no brake and is in a range of strength in which the display unit 20 can be opened and closed directly by a hand without hindrance.

Figure 36:
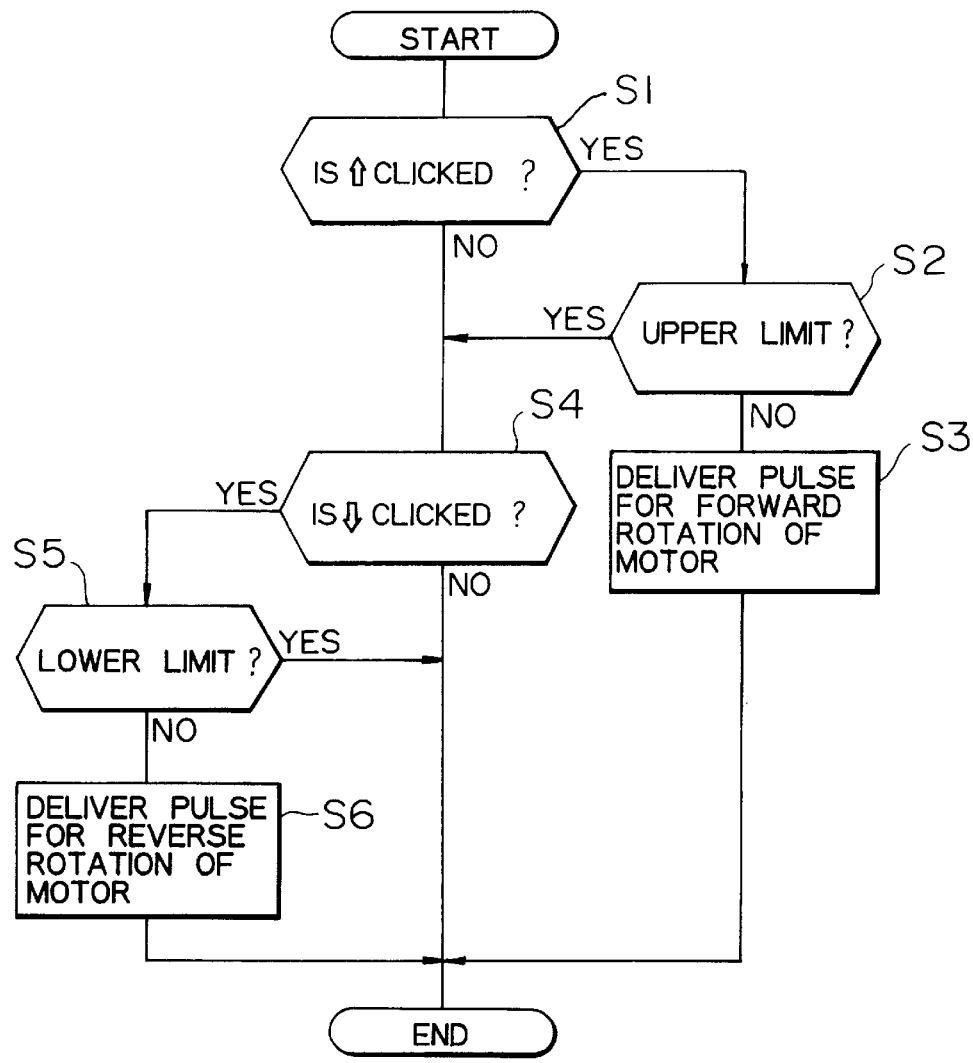
FIG. 36 is a flow chart showing an operation for causing a pivotal movement of the display unit.

The flow chart of a motor control program is shown in FIG. 36. When it seems that the tilt angle of the display unit 20 is not proper and it is desired to move the display unit 20 upward (or in an opening direction), the click region 32 (see FIG. 35A or 35B) is clicked. In step S1, the click is recognized by the CPU 28a which may be a main CPU of the work station or a small-sized CPU called a controller to control an I/O system. In step S2, the judgement is made as to whether or not the display unit 20 is positioned at the upper limit. When the display unit 20 is not positioned at the upper limit, a command for delivery of a pulse for causing a forward rotation of the stepping motor 21 is issued from the CPU 28a to the stepping motor controller 21a (step S3). In accordance with this command, the stepping motor controller 21a outputs the pulse for the forward rotation to the motor driver 21b which in turn supplies a power pulse enough to rotate the motor 21. In the case where it is determined in step S1 that the click region 32 is not clicked or it is determined in step S2 that the display unit 20 is positioned at the upper limit, the judgement is made as to whether or not the click region 31 is clicked (step S4). If the click region 31 is clicked and the display unit is not positioned at the lower limit, a command for delivery of a pulse for causing a reverse rotation of the stepping motor 21 is issued from the CPU 28a to the stepping motor controller 21a (step S6). In the case where it is determined in step S4 that the click region 31 is not clicked or it is determined in step S5 that the display unit 20 is positioned at the lower limit, the processing is completed.

The foregoing has been explained in conjunction with the embodiments of a space-saving information processing apparatus in which the keyboard unit 40 is detachable from the body 10. Next, explanation will be made of an example, in which the present invention is applied to a space-saving information processing apparatus and a display unit cannot be detached from a body. The explanation will be made by use of FIGS. 37 to 40.

Figure 37:
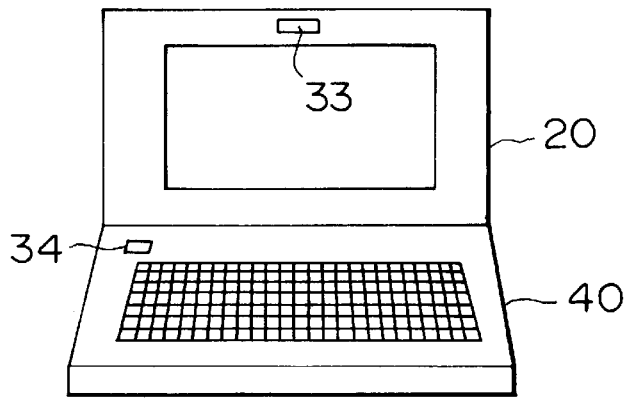
FIG. 37 a front view showing an obstacle detecting device provided on the display unit.
Figure 38:
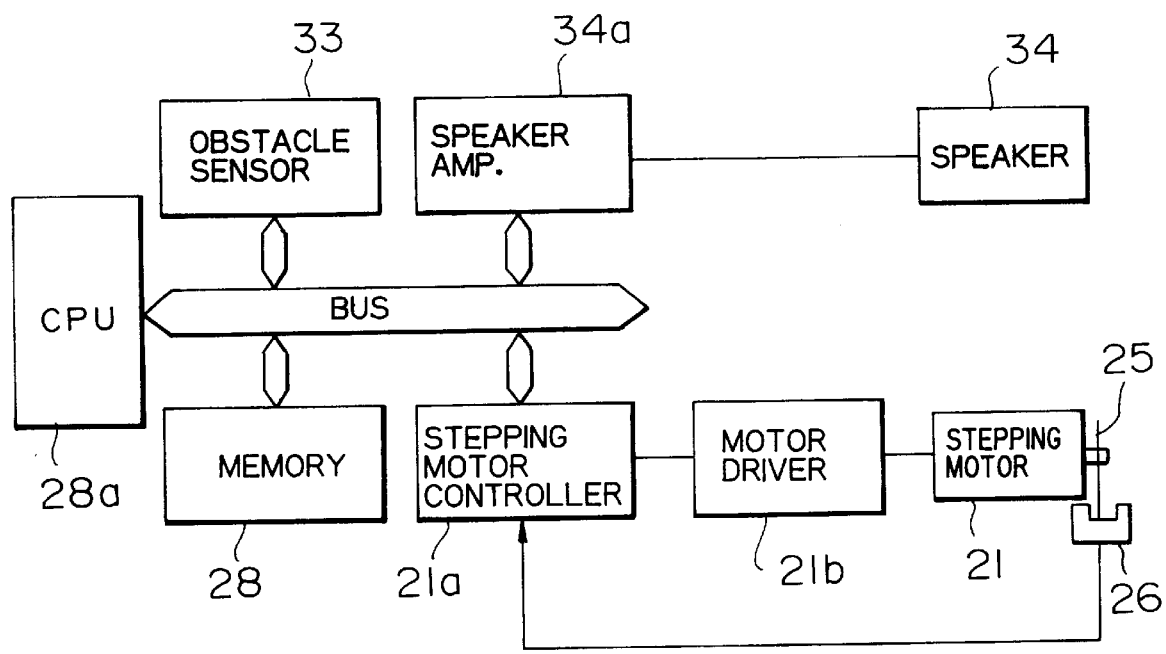
FIG. 38 is a block diagram showing the circuit construction of the obstacle detecting device.

In FIG. 37, reference numeral 33 designates an obstacle sensor for detecting whether or not an obstacle is present in front of a display unit 20, and numeral 34 designates a speaker which when an obstacle is detected by giving notice of the detection of an obstacle through a speaker amplifier 34a (see FIG. 38) when the obstacle is detected by the obstacle sensor 33. In FIG. 38, reference numeral 21 designates a stepping motor for pivotally rocking the display unit 20, numeral 25 a light shield plate holding disk, and numeral 26 a photo interrupter. The obstacle sensor 33 may be a sensor which measures a distance from the display unit 20 to an obstacle or the existence of the obstacle by using infrared rays or an ultrasonic wave to utilize the interference with a reflected wave thereof or by using a pair of a light emitting element and a light receiving element to detect the interruption of light by the obstacle. Instead of such a method of detecting an obstacle in a non-contact manner may be employed a method a transparent dielectric is sandwiched between two transparent thin electrodes to form a condenser, thereby detecting a change in capacitance caused by the deformation of the dielectric when the condenser contacts the obstacle or a method in which a change in current value caused by an increase of the load of the motor is detected.

The light shield plate holding disk 25 shown in FIG. 38 is basically the same as that explained in conjunction with FIG. 32. However, a light shield plate 25a (see FIG. 32) for lower limit provided on the light shield plate holding disk 25 is provided not for indicating the lower limit of a pivotal rocking movement of the display unit 20 when the keyboard unit 40 is detached but for indicating that the display unit 20 contacts the keyboard unit 40, thereby resulting in a non-operation condition.

Figure 39:
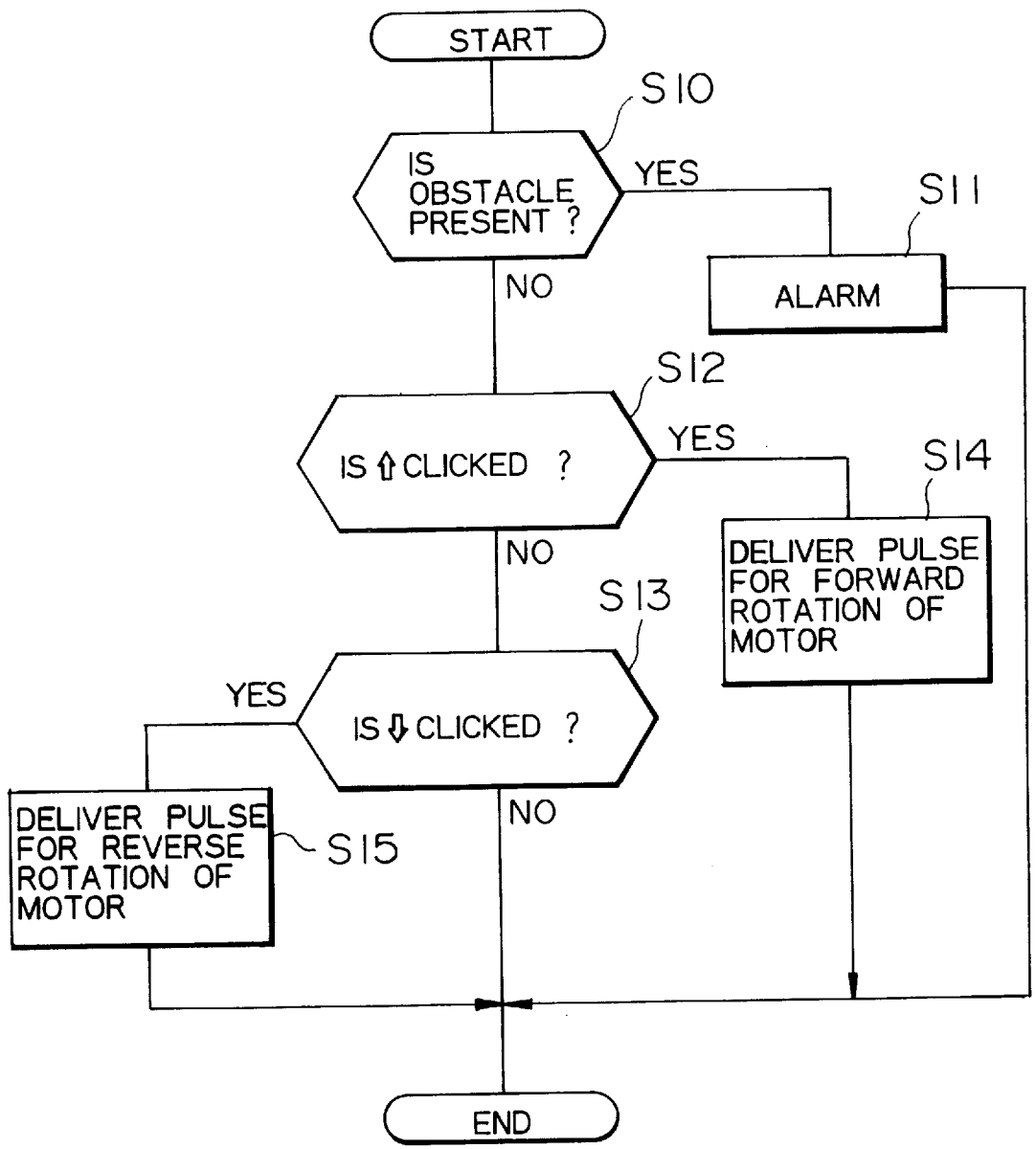
FIG. 39 is a flow chart showing the operation of the display unit based on the obstacle detecting device.
Figure 40:
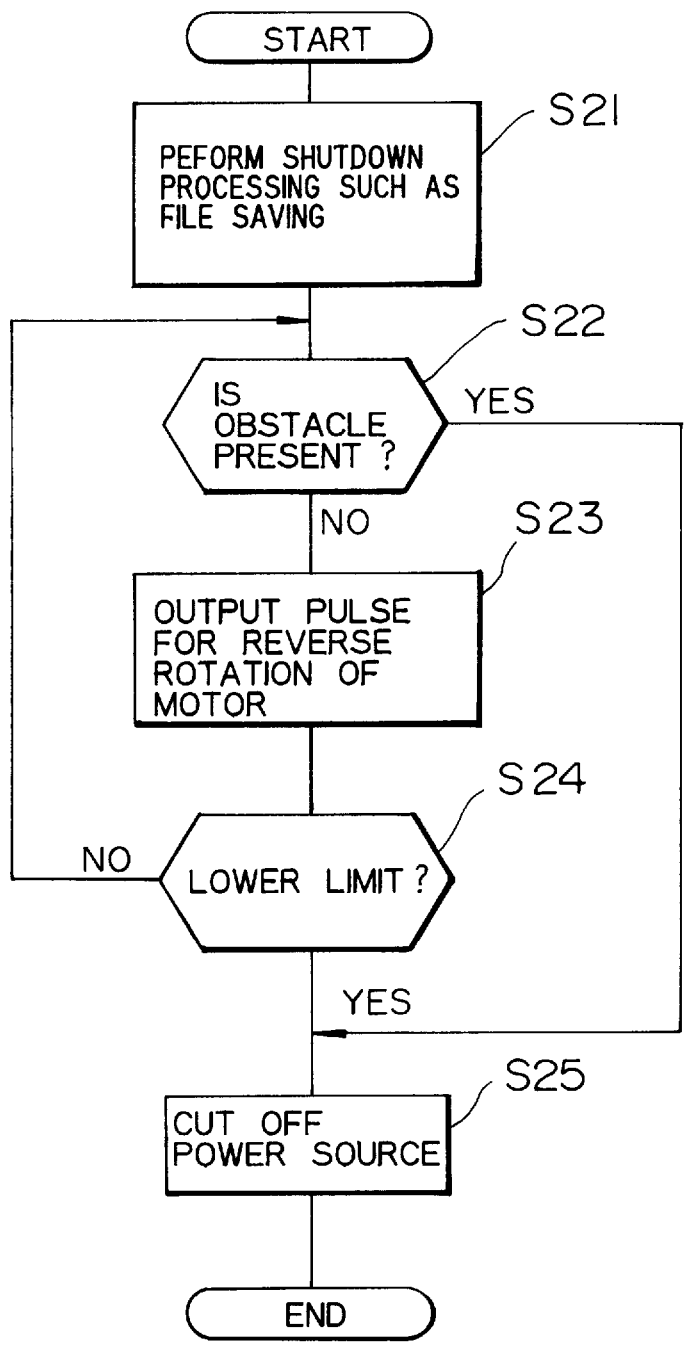
FIG. 40 is a flow chart showing an operation for bringing the display unit into a non-operation (or closed) condition.

In a memory 28 is stored not only a general program for operating the apparatus but also programs for performing processings of flow charts shown in FIGS. 39 and 40.

The operation of the present embodiment will now be explained in accordance with the flow charts shown in FIGS. 39 and 40.

As shown in FIG. 39, when the obstacle sensor 33 detects an obstacle in step S10, an alarm giving the notice of the existence of the obstacle is outputted from the speaker 34 for a predetermined time in step S11, thereby immediately completing the processing. Namely, in the case where there is an obstacle, the alarm is issued but it is not possible to pivotally rock the display unit 20 (or the rocking movement is restricted). In the case where there is no obstacle, a pulse for forward rotation or reverse rotation is applied to the stepping motor 21 (step S14 or S15) in accordance with the judgement in step S12 as to whether or not the click region 32 (see FIGS. 35A and 35B) is clicked or the judgement in step S13 as to whether or not the click region 31 (see FIGS. 35A and 35B) is clicked. Thus, prior to the delivery of the pulse to the motor 21, data from the obstacle sensor 33 is scanned to prevent the display unit 20 from being broken.

In a work station of UNIX system or the like, in the case where the operation is to be finished, a power cut-off is made by a software since it is not possible to immediately cut off the power supply. The case where the display unit 20 is automatically closed upon completion of a shutdown processing, is convenient since a time saving is attained in comparison with the case where the display unit 20 is closed after the confirmation of the completion of the shutdown processing and the cut-off the power supply. A flow chart concerning the former case is shown in FIG. 40.

When a user instructs the cut-off of a power supply by the click of a mouse or the like, a shutdown processing such as a file saving is performed in step S21. Next, the examination is made of whether or not there is an obstacle (step S21). If there is an obstacle, the power supply is cut off in step S25, thereby completing the processing. If there is no obstacle, the motor is rotated in a reverse direction (step S23) to start closing the display unit 20. If an obstacle is detected in course of closing of the display unit 20, the display unit 20 is stopped at an angle in that condition and the power supply is cut off in step S25. If no obstacle is detected in course of closing of the display unit 20, the cut-off of the power supply is made at a point of time when the photo interrupter 26 detects the lower limit by virtue of the light shield plate 25a for lower limit (see FIG. 32) in step S24. The detection of the lower limit indicates that the display unit 20 is completely closed.

Pursuing a convenience, there may be considered a work station which has a sensor even on the back surface side of the display unit 20 and the display unit 20 is automatically opened by a software upon startup by a power ON switch. In this case, if an obstacle is detected, the display unit 20 is stopped at an angle in that condition and the operation is normally started. If no obstacle is detected, a rock angle at the preceding shutdown processing is revived and the operation is then started. Also, it is possible to start the operation after the display unit has been opened in accordance with a logged-in user name at an angle set by that user (or taken upon shutdown). In order to revive the rock angle of the display unit 20 in this way, it is necessary to store a rock angle upon shutdown processing or a rock angle designated by an user.

The present embodiment has been explained in conjunction with an apparatus in which the keyboard unit 40 cannot be separated from the body 10. However, it is needless to say that the breakage of the display unit 20 can be prevented even if the present embodiment is applied to an apparatus in which the keyboard unit 40 can be separated from the body 10.

Figure 41:
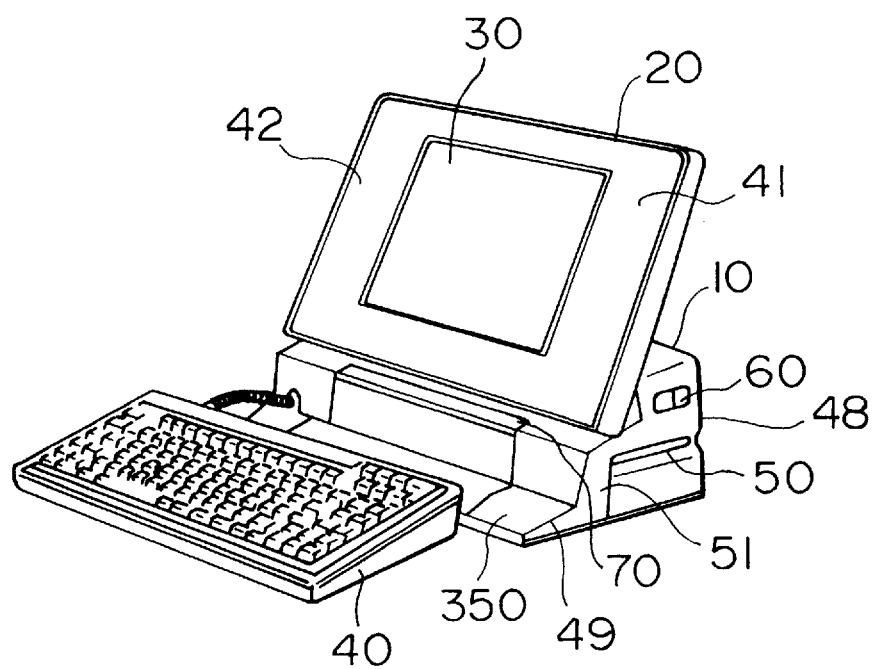
FIG. 41 is a perspective view showing an example of pilot portions provided in the display unit.

Further, an example of the display unit will be explained. In this example, a pilot portion 41 is provided on a display unit 20 and a multi-layer printed circuit board 120a is used in a body 10. FIG. 41 shows such an apparatus. The construction of the apparatus shown in FIG. 41 is basically similar to that of the apparatus shown in FIG. 1. Therefore, components in FIG. 41 identical to those in FIG. 1 are designated by the same reference numerals as those used in FIG. 1 and detailed explanation thereof will be omitted.

In FIG. 41, pilot portions 41 indicating that a body 10 is in a power-on condition are symmetrically provided in a frame 42 on a surface of a display unit 20 having a liquid crystal display thereon (or a display surface) and a surface thereof having no liquid crystal display thereon (or a non-display surface). When a power supply is in a turned-on condition and a back light is extinguished, there may be a fear that a power switch is turned off or a power plug is removed from a socket, making an erroneous assumption that the power supply is in a turned-off condition. In some operating systems, it is necessary to complete a processing in accordance with a predetermined procedure. In such a system, data in a main storage may be destroyed if a power supply is turned off notwithstanding that the system is in a condition of non-completion. In the present example, therefore, the pilot portion 41 is provided on the display surface of the display unit 20. The pilot portion 41 is also provided on the non-display surface of the display unit 20, enabling the recognition of the turned-on condition of the power supply even in the case where the display unit 20 is brought down to the front surface side of the body 10 so that the display unit 20 is placed in a state in which the liquid crystal display 30 is invisible from the front.

The pilot portion 41 is positioned in the frame 42 in the vicinity of the corner of a right and upper portion when seen from the front surface side of the liquid crystal display 30, as shown in FIG. 41. More specifically, the pilot portion 41 is positioned in the frame 42 at an outer periphery thereof or in the vicinity of the outer periphery. Since the pilot portion 41 is provided at such a position, a user is not nervous about the pilot portion 41 when the user gazes steadily at the liquid crystal display 30.

The pilot portion 41 is formed by providing a small opening in the frame 42 and accommodating a light emitter in the interior of the display unit 20. The light emitter is composed of an approximately T-shaped light guide member 43 and a light emitting diode 44 mounted therein, as shown in FIG. 42A.

The light emitting diode 44 has a pin 43a fixed to a printed circuit board 45a in the display unit 20 and is connected to a circuit conductor (not shown) on the printed circuit board 120.

Figure 42A:
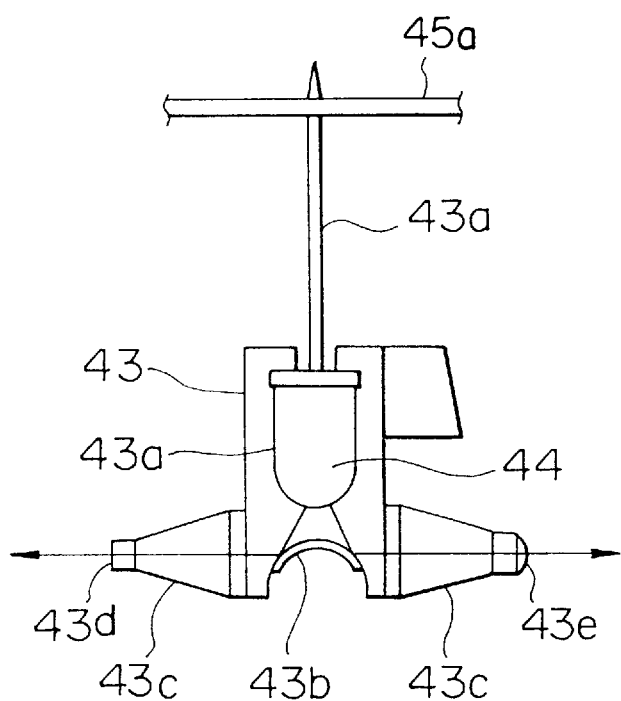
FIGS. 42A to 42D are views showing the construction of the pilot portions in detail.
Figure 42B:
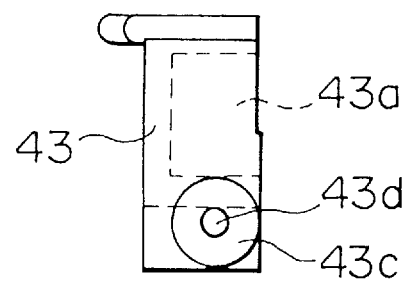

As shown in FIGS. 42A and 42B, the light guide member 43 includes a light emitting diode enclosing portion 43a, a reflector portion 43b for laterally distributing or dividing light emitted from the light emitting diode 44, guide portions 43c for guiding divisional lights respectively, and light emitting or outputting ends 43d and 43e for emitting or outputting the respective guided lights to the exterior. The light emitting ends 43d and 43e are such that end surfaces thereof appear on the display and non-display surfaces of the display unit 20, respectively.

Figure 42C:
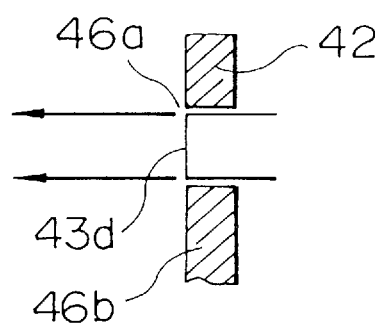
Figure 42D:
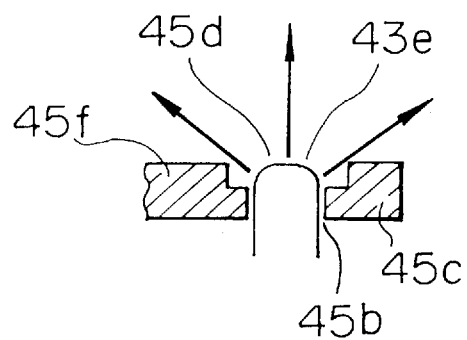

The light emitting end 43d is formed such that the end surface thereof is flat, as shown in FIG. 42C. The light emitting end 43d is inserted in a hole 46a provided in the frame 42 of the display unit 20 so that the end surface is aligned with a surface 46b of the frame 42. On the other hand, the light emitting end 43e is formed such that the end surface thereof is curved, as shown in FIG. 42D. The light emitting end 43e is inserted in a hole 45b provided in a cover 45c on the non-display surface of the display unit 20. A step portion 45d having a large diameter is provided in an opening of the hole 45b on the outer surface 45f side of the display unit 20. The light emitting end 43e is inserted in a space in the step portion 45d and the tip of the light emitting end 43e is positioned to be aligned with the outer surface 45f of the display unit 20.

Since the end surface of the light emitting end 43d is formed to be flat, light emitted from the end surface has a relatively strong directivity. Therefore, the light from the pilot portion 41 is hard to enter the eyes of a user who is gazing at the liquid crystal display 30. Thereby, such light is prevented from becoming a visual hindrance. On the other hand, the display surface is set in a standing condition when the apparatus is used. Therefore, light from the pilot portion 41 can easily be recognized visually even if it has a strong directivity. Also, even in the case where the whole of the display unit is watched at some distance therefrom when the apparatus is not used, light from the pilot portion 41 can easily be recognized visually since the light has a strong directivity so that it reaches at a long distance.

Since the end surface of the light emitting end 43e is curved, light emitted from the end surface is easy to diffuse. Further, since the step portion 45d is provided in the display unit 20, the light emitted in a diffused form goes forward over a wide range. The pilot portion 41 on the non-display surface side of the display unit 20 is necessary to give notice of whether or not the power supply is in a turned-on condition when the display unit 20 is in a state brought down to the front side of the body 10. In such a state of the display unit 20, it is general that the non-display surface of the display unit 20 is watched from an oblique direction. In the present embodiment, since the light from the light emitting end 43e is emitted in the diffused form, a lightened condition of the pilot portion 41 can be recognized visually from any direction.

The brightness and color of the surface of the frame 42 is selected to be similar to the brightness and color of any given one of possible tone or gradation levels of the liquid crystal display 30. In the present example, the color of a grey family is selected and the brightness is selected such that the reflectance becomes 26.1%. In the case where the reflectance is in a range from 20 to 50%, the impression of the display screen as different from the surrounding thereof and the fatigue of eyes are reduced since even if a user faces the liquid crystal display 30 for a long time, since a difference in brightness between the liquid crystal display 30 and the surrounding thereof is less.

In the present example, one light emitting diode 44 is used to emit or output light from the pilot portions 41 on the display and non-display surfaces of the display unit 20. However, separate light emitting elements may be used to form individual pilot portions.

Next, the internal construction of the body of the work station of the third embodiment will be explained.

Figure 43:
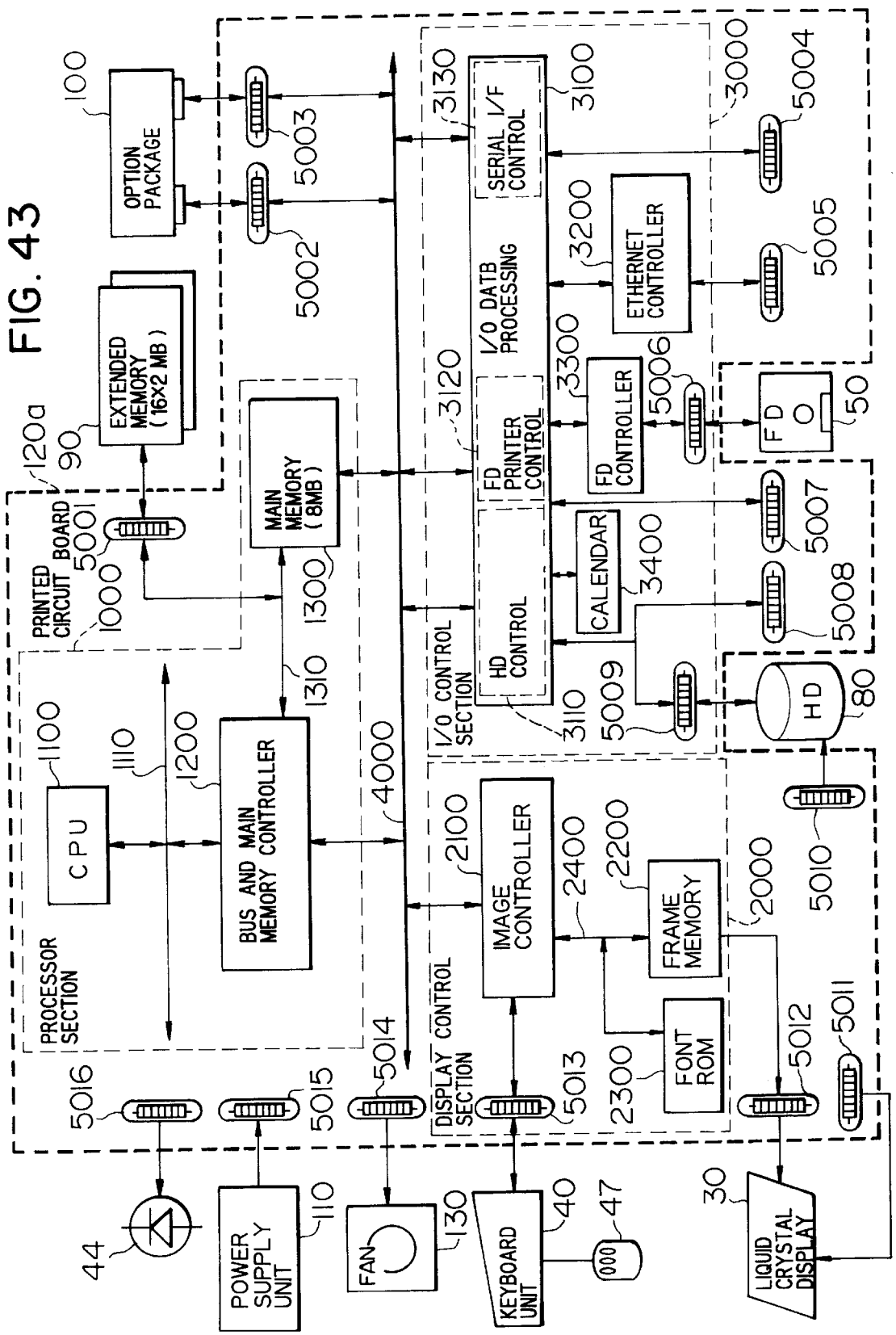
FIG. 43 is a diagram showing the construction of a printed circuit board used in a space-saving information processing apparatus according to a third embodiment of the present invention.
Figure 46:
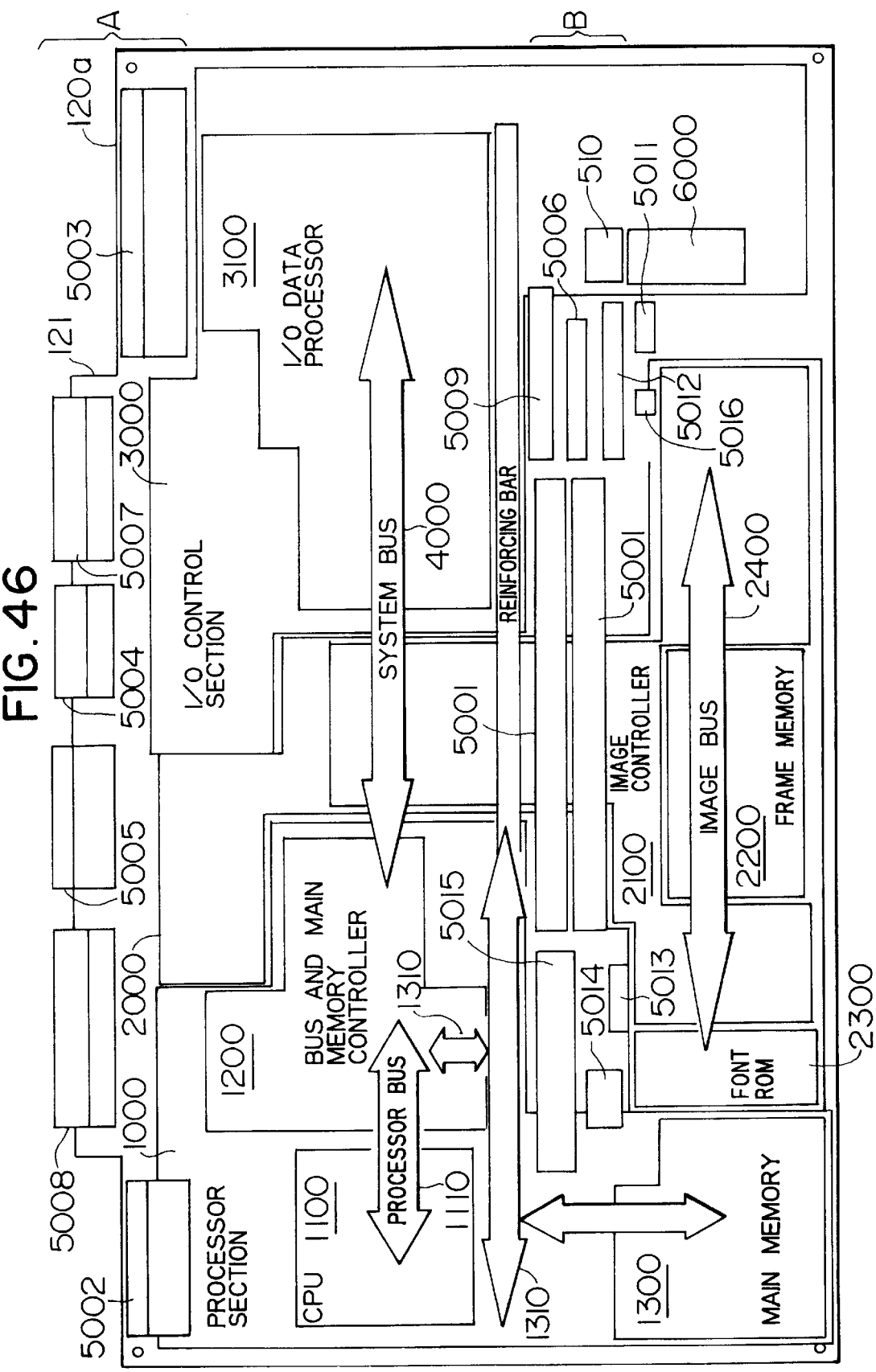
FIG. 46 is a top view showing the arrangement of parts on the printed circuit board.
Figure 47:
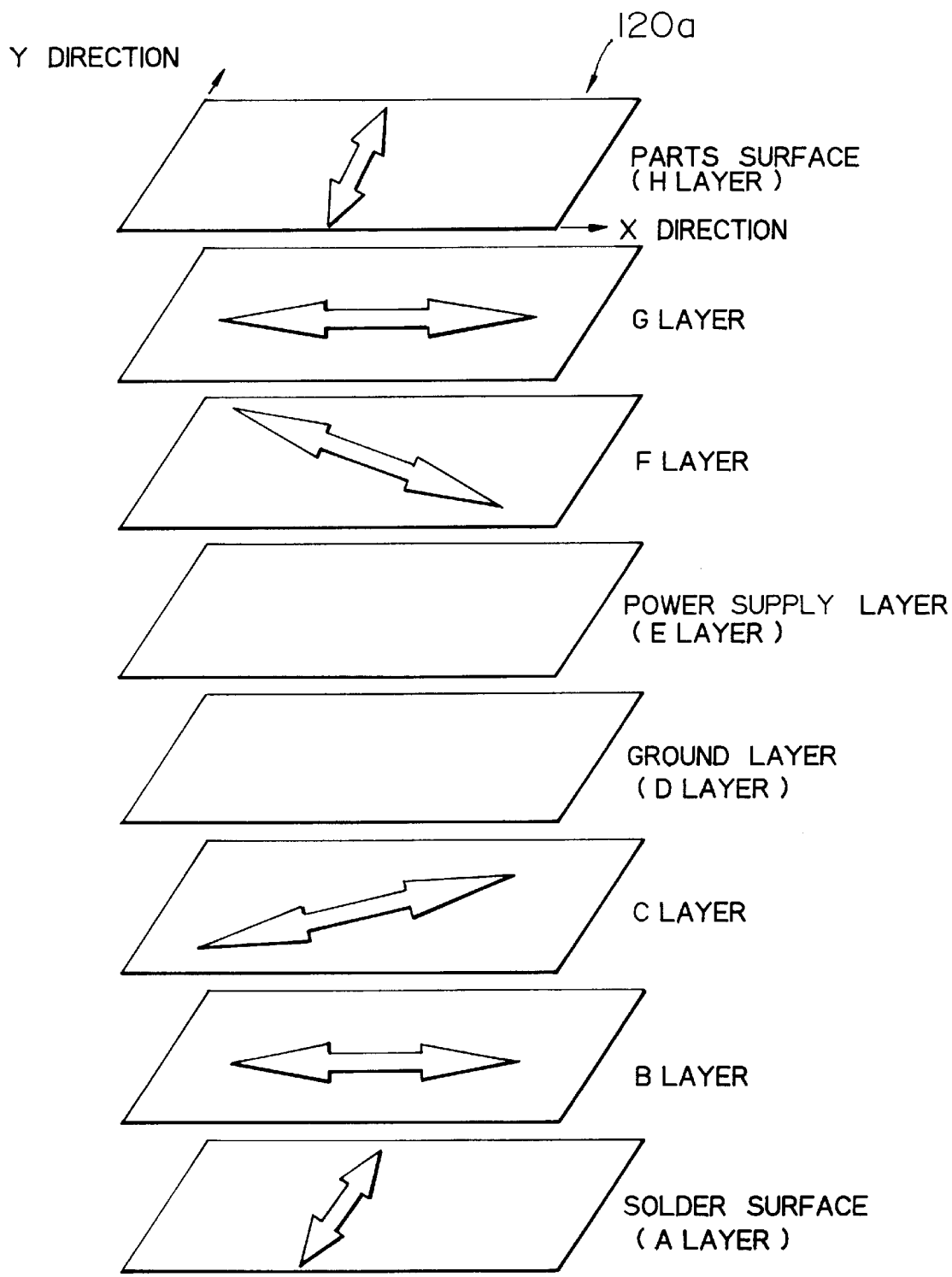
FIG. 47 is a view for explaining layers of the printed circuit board.

FIG. 43 shows diagrammatically the internal construction of the body 10 in the present embodiment. The actual arrangement are shown in FIGS. 46 and 47.

In the work station of the present embodiment, a printed circuit board 120a includes thereon a processor section 1000 for performing a process inclusive of the operation of data, a display control section 2000 for controlling a display unit 20, an I/O control section 3000 for controlling an input/output or the like of I/O devices, a system bus 4000 for connecting the sections 1000, 2000 and 3000, various connectors 5001 to 5016, and a reset switch 6000. The printed circuit board used in the present embodiment is a multi-layer circuit board.

The processor section 1000 is composed of a central processing unit (CPU) for performing an operation and so on, a processor bus 1110 connected to the CPU 1100, a main memory 1300 which has a storage capacity of, for example, 8 MB, and a bus and main memory controller 1200 connected to the processor bus 1110, a memory bus 1310 and the system bus 4000 for controlling a bus and an input/output of the main memory 1300. The memory bus 1310 is connected to an expansion memory connector 5001.

The display control section 2000 is composed of an image bus 2400 for transferring image data, an image controller 2100 connected to the system bus 4000 and the image bus 2400 for generating image data, a frame memory 2200 for storing image data from the image bus 2400, and a font ROM (read only memory) 2300 in which character fonts are stored. The image controller 2100 is connected to a keyboard unit 40 through a keyboard connector 5013 to receive instructions and data from the keyboard unit 40. An output of the frame memory 2200 is connected to a liquid crystal display 30 through a liquid crystal connector 5012. The liquid crystal display 30 is supplied with an electric driving power through a liquid crystal power supply connector 5011.

The I/O control section 3000 is composed of an I/O data processing part 3100 connected to the system bus 4000, an Ethernet controller 3200, a floppy disk (FD) controller 3300 and a calendar 3400. The I/O data processing part 3100 is provided with an HD (hard disk) control portion 3110 for controlling data input/output of a hard disk, an FD/printer control portion 3120 for controlling data input/output of a floppy disk (FD) or a printer, and a serial I/F (interface) control portion 3130 for controlling data input/output through a serial connector 5004. To the I/O data processing part 3100 are connected the Ethernet controller 3200 connected to an Ethernet connector 5005, the FD controller 3300 for controlling the operation of a floppy disk drive 50 connected through an FD connector 5006, a printer connector 5007 for connecting a printer (not shown), the calendar 3400 for generating and outputting calendar data including year, month, day and time, an HD connector 5009 for connecting a hard disk drive 80, and an SCSI (small computer system interface) connector 5008. The hard disk drive 80 is supplied with an electric driving power through a hard disk power supply connector 5010.

There are further provided PK extension connectors 5002 and 5003 for connecting an option package 100, a FAN connector 5014 for supplying an electric power to drive a heat discharging fan 130, a power supply connector 5015 connected to a power supply unit 110 for receiving the supply of an electric power therefrom, the light emitting diode 44 of the pilot portion 41.

Figure 45:
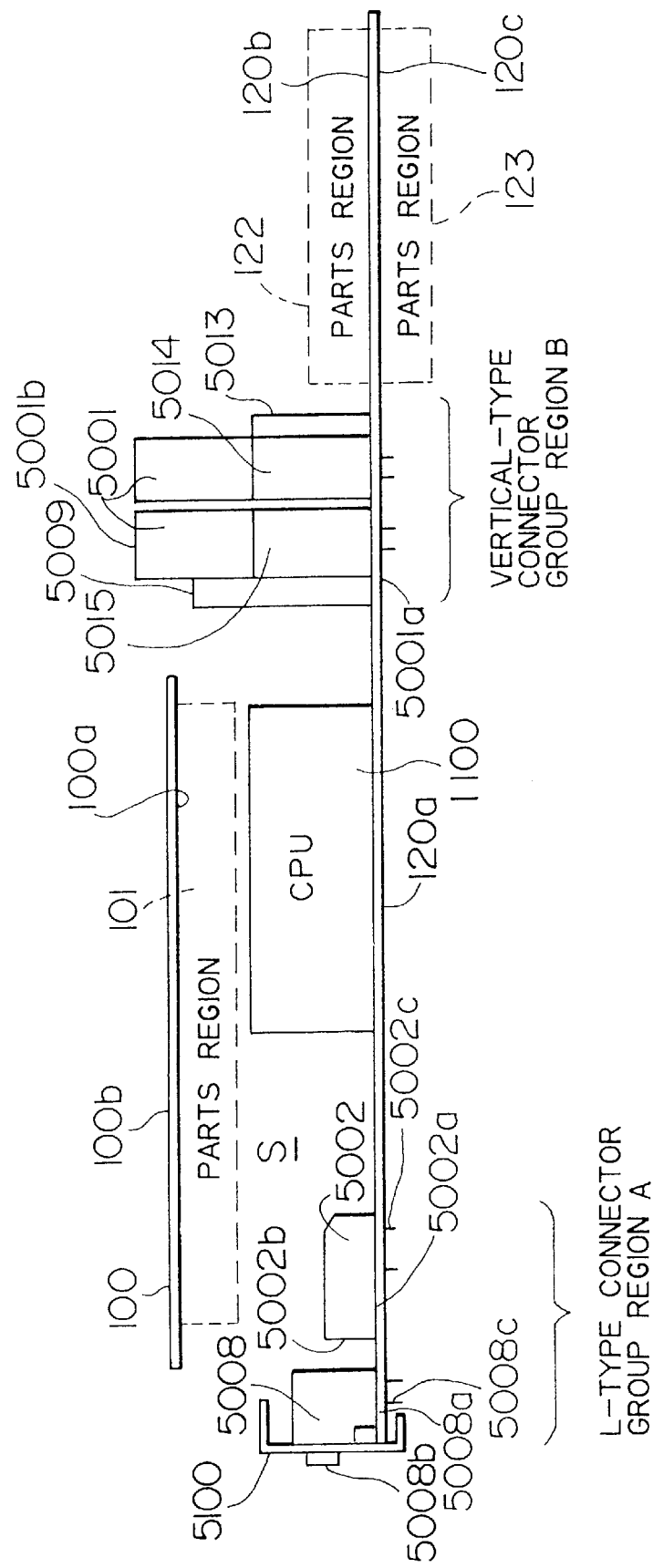
FIG. 45 is a view for explaining the internal construction of a body of the processing apparatus.

Next, explanation will be made of a relationship in arrangement between the parts or components on the printed circuit board 120a. A relationship in plane arrangement is schematically shown by FIG. 46 and a relationship in vertical arrangement is schematically shown by FIG. 45.

Figure 44:
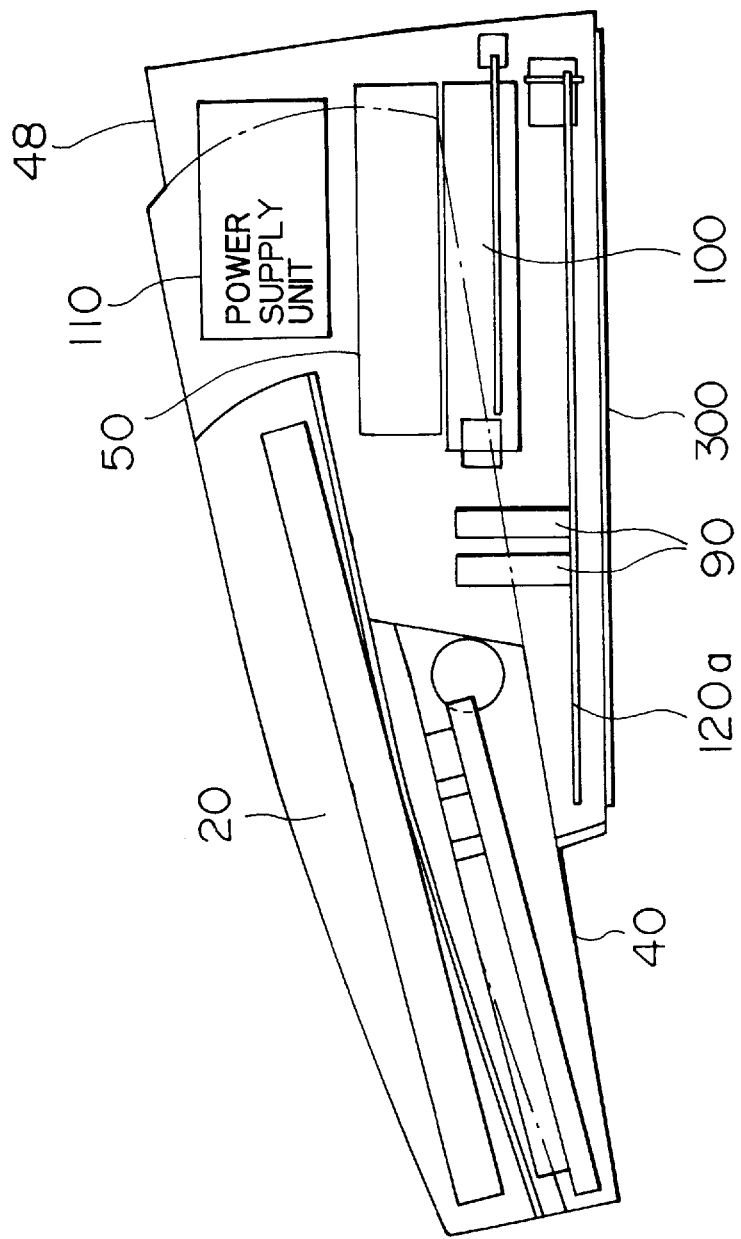
FIG. 44 is a side view of the processing apparatus.

In FIG. 46, the processor section 1000 is disposed on one end side of the printed circuit board 120a, the I/O control section 3000 is disposed on the other end side thereof, and the display control section 2000 is interposed between the processor section 1000 and the I/O control section 3000. The processor section including the CPU 1100, from which a large amount of heat is generated, is positioned on the upper stream side of a cooling air led from the exterior into a casing 48, as shown in FIG. 44, in order to sufficiently cool the CPU 1100.

In the present embodiment, the various connectors are arranged on the printed circuit board 120a in first and second juxtaposed regions A and B each of which extends in a longitudinal direction of the printed circuit board 120a. The first region (or L-type connector group region) A is a peripheral portion of one side of the printed circuit board 120a which extends along the longitudinal direction of the printed circuit board 120a and is positioned on the back side of the casing 48 (or on the upper side in FIG. 46). The second region (or vertical-type connector group region) B is a region along a position where a step portion from a lower portion 49 of the casing 48 to an intermediate portion 51 thereof is provided, as shown in FIG. 41, that is, a stripe-like region along the longitudinal direction of the printed circuit board 120a at a position of a little to the front from a central portion of the printed circuit board 120a.

The first region A is provided the PK extension connector 5002, the SCSI connector 5008, the Ethernet connector 5005, the serial connector 5004, the printer connector 5007 and the PK extension connector 5003 from the left side in this order. These connectors may be, for example, so-called L-type (or F-type) connectors in which a surface to be mounted on the printed circuit board 120a and an end surface for making connection with a connector plug (not shown) on the cable side have a perpendicular relationship, as shown in FIG. 45. For example, the PK extension connector 5002 is placed on a parts surface 120b of the printed circuit board 120a in the L-type connector group region A with a mounting surface 5002a being opposed to the parts surface 120b of the printed circuit board 120a and an end surface 5002b for connection being directed to the back of the body 10. Also, for example, the SCSI connector 5008 is placed on the printed circuit board 120a with a mounting surface 5008a being opposed to the parts surface 120b of the printed circuit board 120a and an end surface 5008b for connection being directed to the back of the body 10 and fixed to a fixing member 5100. Electrical connection is made by inserting pins (for example, 5008c nd 5002c) of those connectors into through-holes (not shown) with the tip ends thereof protruded from a solder surface 120c of the printed circuit board 120a and applying solder to the pins.

The margin of the printed circuit board 120a on the back side thereof has a central portion 121 which protrudes backward. The SCSI connector 5008, the Ethernet connector 5005, the serial connector 5004 and the printer connector 5007 among the above-mentioned connectors are arranged in the protruding portion 121. The PK extension connectors 5002 and 5003 are arranged in a portion of the margin of the printed circuit board 120a which does not protrude. With such an arrangement, the end portions of surfaces of the SCSI connector 5008, the Ethernet connector 5005, the serial connector 5004 and the printer connector 5007 requiring the connection with the exterior can be exposed on the back surface side of the casing 48 as they are in a state in which the connectors are fixed to the printed circuit board 120a, as shown in FIG. 9. On the other hand, the PK extension connectors 5002 and 5003 for making connection with the option package 100 in the casing 48 are usually hidden by the cover 340 (for example, see FIG. 9) except at the time of attachment/detachment of the option package 100. The cover 340 is detachably fixed by screws.

In the second region B shown in FIG. 46, two expansion memory connectors 5001 are arranged in a central portion of the region B. The power supply connector 5015, the FAN power supply connector 5014 and the keyboard connector 5013 are arranged in a portion of the region B on the left side of the central portion. The HD connector 5009, the FD connector 5006, the liquid crystal connector 5012, the HD power supply connector 5010, the LED connector 5016 and the liquid crystal power supply connector 5011 are arranged in a right side portion of the region B. These connectors may be, for example, connectors in which a surface to be mounted on the printed circuit board 120a and an end surface for making connection have a parallel relationship, as shown in FIG. 45. For example, the expansion memory connector 5001 is placed on the parts surface 120b of the printed circuit board 120a in the vertical-type connector group region B with a mounting surface 5001a being opposed to the parts surface 120b of the printed circuit board 120a and an end surface 5001b for connection being directed upward. Electrical connection is made in a manner similar to that mentioned in conjunction with the case of the L-type connectors.

The printed circuit board 120a has a space of the intermediate portion 51 (see FIG. 41) above the board on the backward side of a position where the expansion memory connectors 5001 are provided. Accordingly, it is possible to arrange relatively thick circuit elements such as the CPU 1100 and various connectors in that space. On the other hand, a space on the forward side of the position where the extension memory connectors 5001 are provided, has a small height. Therefore, relatively thin elements such as memory elements inclusive of the main memory 1300, the font ROM 2300 and the frame memory 2200 and the reset switch 6000 are arranged in the forward side space. In the present embodiment, those memory elements are mounted in parts regions 122 and 123 shown in FIG. 45. Namely, the memory elements are mounted on the parts surface 120b and the solder surface 120c of the printed circuit board 120a to provide a double-faced mounted structure. Alternatively, there may be employed a construction in which a part or the whole of the memory elements including the main memory 1300, the font ROM 2300, the frame memory 2200 and so on are mounted in only the parts region 122.

In the present embodiment, the main memory 1300 is arranged at a corner portion of the printed circuit board 120a. In general, this kind of board has less wirings at the corner portion. Therefore, a multiplicity of wirings associated with the main memory 1300 can be arranged easily with no hindrance to the other wirings.

As shown in FIG. 46, the processor bus 1110 and the system bus 4000 are provided along the longitudinal direction of the printed circuit board 120a (or the right/left direction of the casing 48) and in a region on the backward side of the position where the expansion memory connectors 5001 are provided. In a region on the forward side of the position where the expansion memory connectors 5001 are provided, the image bus 2400 is provided along the longitudinal direction of the printed circuit board 120a (or the right/left direction of the casing 48). In a region on the left side of the position where the expansion memory connectors 5001 are provided, the memory bus 1310 is provided between the main memory 1300 and a region including the CPU 1100 and the bus and main memory controller 1200. In FIG. 46, those buses are schematically depicted by showing only their wiring directions. The actual wirings are complicated. Wirings of the buses and so on can be allotted by use of a known automatic wiring algorithm when the printed circuit board 120a is provided with a multi-layer circuit structure.

The printed circuit board 120a is formed by laminating a plurality of layers each of which includes a dielectric made of, for example, polyimide having conductors made of, for example, copper provided thereon. The procedure of lamination can use any one of various methods. For example, there may be employed a method in which dielectric sheets having necessary conductors beforehand provided thereon are successively laminated. The printed circuit board 120a in the present embodiment is formed by the lamination of an A layer (or a solder surface), a B layer, a C layer, a D layer (or a ground layer), an E layer (or a power supply layer), an F layer, a G layer and an H layer (or a parts surface) in this order from the lower surface side. An arrow shown in each of the A, B, C, F, G and H layers schematically represents the direction of wiring in that layer. More particularly, the arrows in the A and H layers show the wirings in a Y-axis direction, the arrows in the B and G layers show the wirings in an X-axis direction, and the arrows in the C and F layers show the wirings in oblique directions which intersect each other. With such a wiring structure, parallel regions, between which crosstalk is liable to be generated, are reduced, thereby making it possible to suppress crosstalk between the A layer and the C layer and crosstalk between the B layer and the C layer. Similarly, it is possible to suppress crosstalk between the G layer and the F layer and crosstalk between the H layer and the F layer. Also, with such a wiring structure, the arrangement of a pair of a power supply layer and a ground layer suffices between a pair of wiring layer sets each of which includes X-direction, Y-direction and oblique-direction wiring layers. In the case where the wiring layers include only X-direction and Y-direction wiring layers and do not include oblique-direction wiring layers, it is preferable that the lamination is formed by interposing a power supply layer or a ground layer between every pair of wiring layers in order to suppress crosstalk. In the case where an X-direction or Y-direction wiring layer is adjacent to a wiring layer including wirings of the same direction (that is, the X-direction or Y-direction), the wiring route may be determined in such a manner that the length of wiring portions which become parallel between the adjacent wirings is selected to be smaller than a predetermined length. Thereby, crosstalk can be suppressed.

Figure 48:
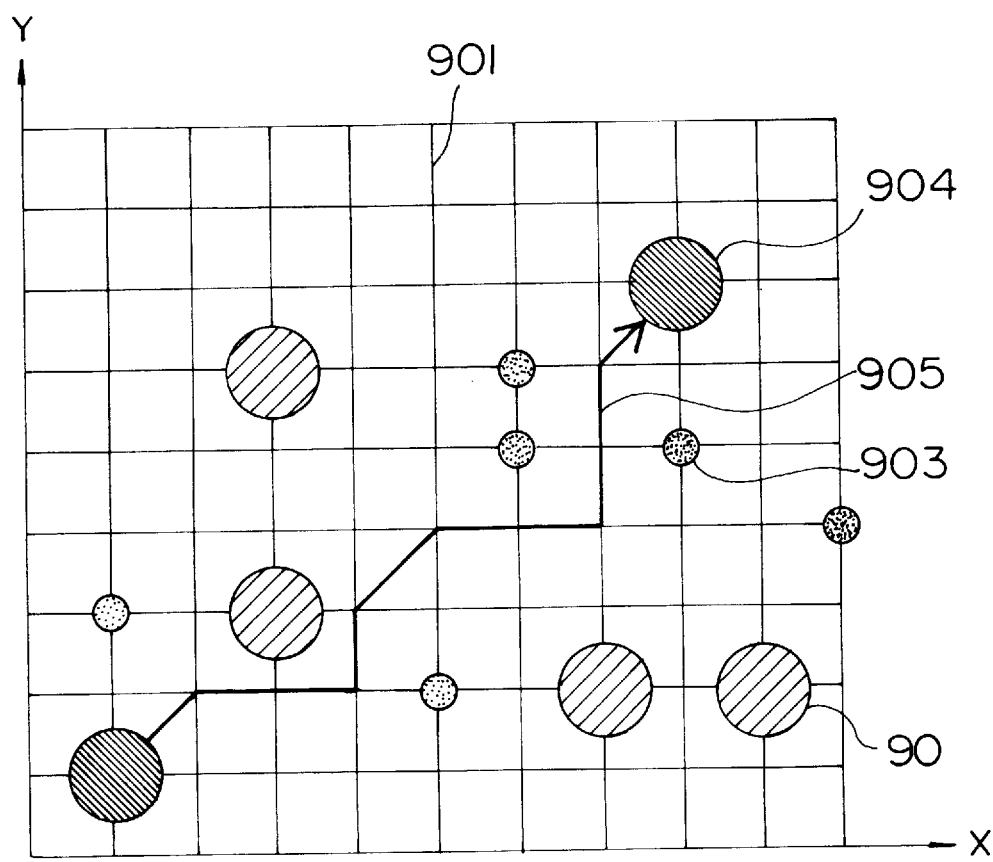
FIG. 48 is a view for explaining an example of design of wirings of the printed circuit board.

FIG. 48 schematically shows one example of the oblique wiring. The determination of the route of an oblique wiring is made on an imaginary wiring grid 901 which follows the X and Y axes. First, the positions of necessary parts terminal holes 902, through-holes 903 and connection terminals 904 are determined on the wiring grid 901 and the coordinates of the determined positions are registered. Thereafter, a start coordinate and a target coordinate are determined. Next, a search is made for a wiring route. The search for the wiring route is made in such a manner that the judgement of whether or not an obstacle exists in a direction of 45° toward the target grid point from the start grid point is made on the basis of the beforehand registered coordinate data and the route of the oblique wiring is determined if no obstacle exists. This is conducted for every grid point. On the other hand, in the case where an obstacle exists, a search for roundabout routes in the X and Y directions is made and the shortest route is determined as a wiring route. The above is repeated to determine a wiring route to the target grid point. The determined wiring route or pattern is shown by reference numeral 903 in FIG. 48.

Figure 49:
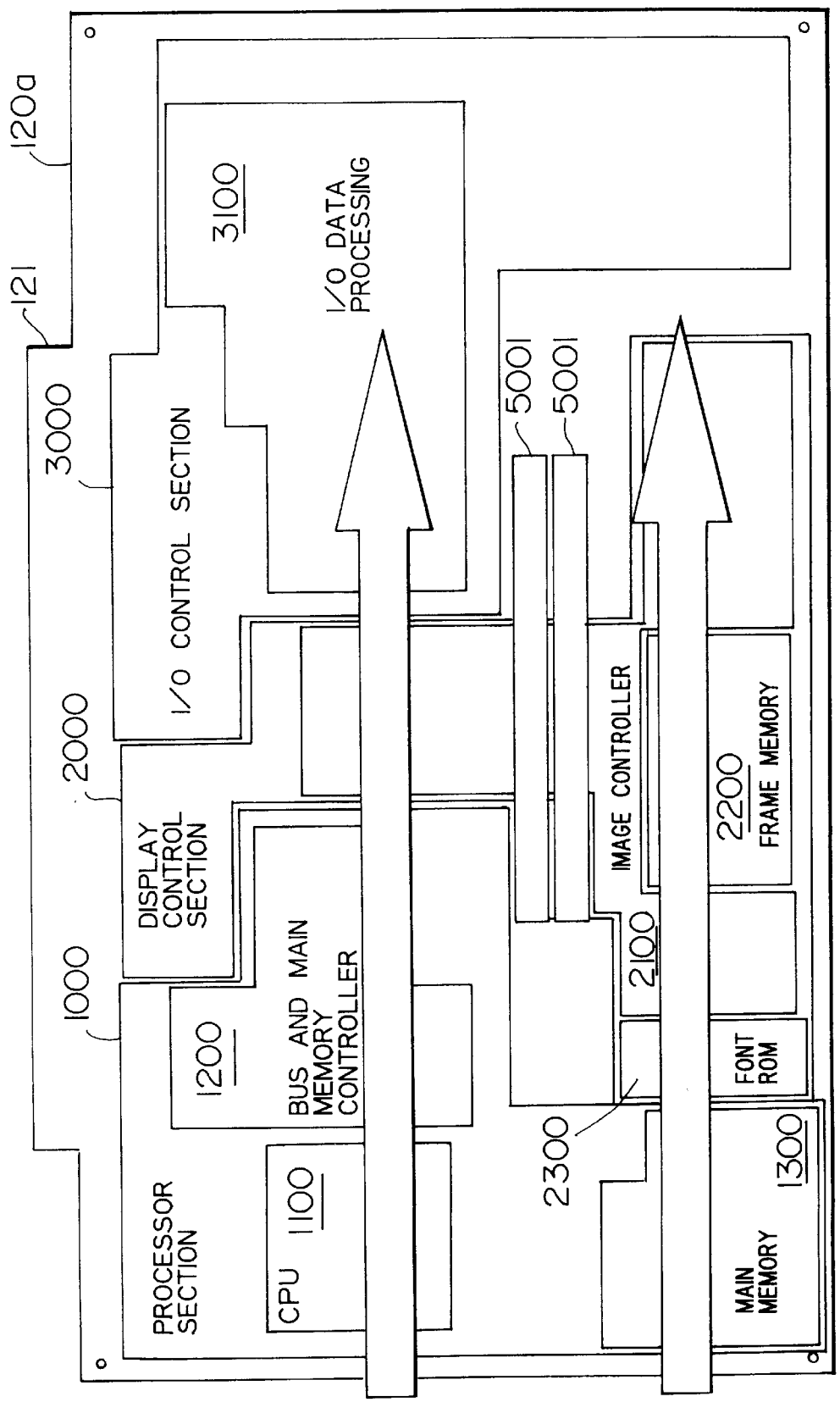
FIG. 49 is a view for explaining the flow of a cooling air on the printed circuit board.

FIG. 49 shows a diagram for explaining flow of cooling air on the multi-layer printed circuit board 120*a*. The cooling air led from the air inlet 240 (referring to FIGS. 6 and 7) is separately flown along both the far side and the front side of the expansion memory connector 5001 with respect to the longitudinal direction of the printed circuit board 120*a*. As described previously, the far side has a relatively with space between the printed circuit board 120*a* and the option package 100. On the other hand, the front side has a relatively narrow space located above the printed circuit board 120*a*. Because of this, the most of the intake air is flown along the far side of the expansion memory connector 5001. Accordingly, since the main memory 1300, the font memory 2300 and the like which generate relatively low heat value are mainly arranged on the front side of the expansion memory connector 5001, it is enough to cool these memories with relatively small amount of the air. Also, since the CPU 1100 and the like which are relatively high heat value are arranged on the far side of the expansion memory connector 5001, it is necessary to flow relatively large amount of the air. In the embodiment, the space is present between the printed circuit board 120*a* and the option package 100, so that it is sufficient to flow enough air. As a result, the circuit elements, such as the processor, memories, control circuit IC's and the like can be mounted with high packing density attaining space saving. Also, it is possible to achieve the small-size information processing apparatus having high-efficiency cooling performance.

What is claimed is:

1. A space-saving information processing apparatus comprising:
   a body having an information processing function;
   display means for displaying information, said display means being pivotally coupled to said body such that said display means is pivotable between a completely closed position and a completely open position;
   input means for inputting data, said input means being separate from said body; and
   an input means supporting portion extending from said body such that said input means can be sandwiched between said input means supporting portion and said display means when said display means is pivoted to said completely closed position;
   wherein a height of a back portion of said body is larger than a height of a front portion of said body having said input means supporting portion;
   wherein a back surface of said body has leg portions to be placed on a horizontal surface such that a longitudinal direction of said apparatus is perpendicular to said horizontal surface;
   wherein said inclined surface of said input means supporting portion has a resting portion; and
   wherein said input means can be made to stand against said input means supporting portion by bringing said input means into engagement with said resting portion.

2. A space-saving information processing apparatus comprising:
   a body having an information processing function;
   display means for displaying information, said display means being pivotally coupled to said body such that said display means is pivotable between a completely closed position and a completely open position;
   input means for inputting data, said input means being separate from said body; and
   an input means supporting portion extending from said body such that said input means can be sandwiched between said input means supporting portion and said display means when said display means is pivoted to said completely closed position;
   wherein said input means supporting portion extends from a lower portion of said body;
   wherein a width of said input means supporting portion is approximately equal to a width of said input means;
   wherein said input means supporting portion has an inclined surface descending at a predetermined angle from said body when a bottom surface of said body is placed on a horizontal surface;
   wherein said inclined surface of said input means supporting portion has a resting portion;
   wherein said input means can be made to stand against said display means by bringing said input means into engagement with said resting portion; and
   wherein when said input means is made to stand against said display means, said input means has an inclination such that said input means does not cover an entire display surface of said display means.

3. A space-saving information processing apparatus comprising:
   a body having an information processing function;
   display means for displaying information, said display means being pivotally coupled to said body such that said display means is pivotable between a completely closed position and a completely open position;
   input means for inputting data, said input means being separate from said body; and
   an input means supporting portion extending from said body such that said input means can be sandwiched between said input means supporting portion and said display means when said display means is pivoted to said completely closed position;
   wherein said input means supporting portion extends from a lower portion of said body to rigidly support said input means;
   wherein a width of said input means is approximately equal to a width of said body;
   wherein said body has a removable L-shaped step portion above said lower portion of said body from which said input means supporting portion extends; and
   wherein an expansion unit insertion port is provided behind said removable L-shaped step portion of said body to enable an expansion component to be inserted into said expansion unit insertion port when said removable L-shaped step portion is removed from said body.

4. A space-saving information processing apparatus comprising:
   a body having an information processing function;
   display means for displaying information, said display means being pivotally coupled to said body such that said display means is pivotable between a completely closed position and a completely open position;

input means for entering data, said input means being separate from said body;

an input means supporting portion extending from said body such that said input means can be sandwiched between said input means supporting portion and said display means when said display means is pivoted to said completely closed position;

power supply means disposed in said body at an uppermost portion of said body;

at least one disk type storage means disposed in said body under said power supply means; and a first printed circuit board disposed in said body under said at least one disk type storage means;

wherein said power supply means and said at least one disk type storage means are disposed in said body at a back side of said body;

wherein said first printed circuit board is disposed in said body along a bottom surface of said body; and wherein said at least one disk type storage means includes at least two disk type storage means disposed side by side in said body in a width direction of said body.

5. A space-saving information processing apparatus comprising:

a body having an information processing function;

display means for displaying information, said display means being pivotally coupled to said body such that said display means is pivotable between a completely closed position and a completely open position;

input means for entering data, said input means being separate from said body;

an input means supporting portion extending from said body such that said input means can be sandwiched between said input means supporting portion and said display means when said display means is pivoted to said completely closed position;

power supply means disposed in said body at an uppermost portion of said body;

at least one disk type storage means disposed in said body under said power supply means; and a first printed circuit board disposed in said body under said at least one disk type storage means;

wherein said first printed circuit board includes a memory mounting board;

wherein said body has an L-shaped step portion above said input means supporting portion; and wherein an expansion unit insertion port leading to said memory mounting board is provided in said L-shaped step portion of said body.

6. A space-saving information processing apparatus comprising:

a body having an information processing function;

display means for displaying information, said display means being pivotally coupled to said body such that said display means is pivotable between a completely closed position and a completely open position;

input means for entering data, said input means being separate from said body;

an input means supporting portion extending from said body such that said input means can be sandwiched between said input means supporting portion and said display means when said display means is pivoted to said completely closed position;

power supply means disposed in said body at an uppermost portion of said body;

at least one disk type storage means disposed in said body under said power supply means; and a first printed circuit board disposed in said body under said at least one disk type storage means;

wherein said display means has a display surface and a non-display surface; and wherein said apparatus further comprises:
  a first pilot portion disposed on said display surface; and
  a second pilot portion disposed on said non-display surface.

7. A space-saving information processing apparatus comprising:

a body having an information processing function;

display means for displaying information, said display means being pivotally coupled to said body such that said display means is pivotable between a completely closed position and a completely open position;

input means for entering data, said input means being separate from said body;

an input means supporting portion extending from said body such that said input means can be sandwiched between said input means supporting portion and said display means when said display means is pivoted to said completely closed position;

power supply means disposed in said body at an uppermost portion of said body;

at least one disk type storage means disposed in said body under said power supply means; and a first printed circuit board disposed in said body under said at least one disk type storage means;

wherein said display means has a display surface and a non-display surface;

wherein said apparatus further comprises:
  a first pilot portion disposed on said display surface; and
  a second pilot portion disposed on said non-display surface;
  wherein said first pilot portion includes a first emitter having a flat surface exposed on said display surface;
  wherein said second pilot portion includes a second emitter having a curved surface exposed on said non-display surface;
  wherein said apparatus further comprises:
    a light emitting diode for emitting light; and
    a reflector portion for reflecting said light emitted from said light emitting diode into said first emitter and said second emitter;
    wherein said light reflected into said first emitter is emitted from said flat surface of said first emitter as light having a relatively strong directivity; and
    wherein said light reflected into said second emitter is emitted from said curved surface of said second emitter as diffused light.

8. A space-saving information processing apparatus comprising:

a body having an information processing function;

display means for displaying information, said display means being pivotally coupled to said body such that said display means is pivotable between a completely closed position and a completely open position;

input means for entering data, said input means being separate from said body and being selectively connectable to said body and detachable from said body;

an input means supporting portion extending from said body such that said input means can be sandwiched between said input means supporting portion and said display means when said display means is pivoted to said completely closed position;

detachment detecting means for detecting when said input means is detached from said body; and pivotal movement restricting means for restricting a range of pivotal movement of said display means when said detachment detecting means detects that said input means is detached from said body.

9. A space-saving information processing apparatus according to claim 8, wherein said pivotal movement restricting means includes:

restriction detecting means for detecting when said display means is at a position in said range of pivotal movement at which pivotal movement of said display means is restricted; and alarm means for generating an alarm signal when said restriction detecting means detects that said display means is at said position in said range of pivotal movement at which pivotal movement of said display means is restricted.

10. A space-saving information processing apparatus according to claim 8, wherein said pivotal movement restricting means includes obstacle detecting means for detecting an obstacle in said range of pivotal movement of said display means.

11. A space-saving information processing apparatus according to claim 8, wherein said pivotal movement restricting means includes:

pivotal movement designating means for designating a direction of pivotal movement of said display means and an amount of pivotal movement of said display means; and pivotal movement driving means for pivotally moving said display means by said amount of pivotal movement designated by said pivotal movement designating means in said direction of pivotal movement designated by said pivotal movement designating means.

12. A space-saving information processing apparatus according to claim 11, wherein said pivotal movement restricting means further includes shutdown pivotal movement designating means for controlling said pivotal movement driving means to pivotally move said display means to a shutdown pivotal movement position where said input means is sandwiched between said display means and said input means supporting portion when said apparatus is shut down.

13. A space-saving information processing apparatus according to claim 11, wherein said pivotal movement restricting means further includes:

storage means for storing a shutdown pivotal movement position at which said input means is sandwiched between said display means and said input means supporting portions and a startup pivotal movement position to which said display means is to be pivotally moved when said apparatus is started up; and startup pivotal movement designating means for controlling said pivotal movement driving means to pivotally move said display means to said startup pivotal movement position stored in said storage means when said apparatus is started up.

14. A space-saving information processing apparatus comprising:

a body having an information processing function;

display means for displaying information, said display means being pivotally coupled to said body;

input means for entering data, said input means being separate from said body; and a multi-layer printed circuit board disposed in said body, said multi-layer printed circuit board including:

a first end portion having disposed thereon circuit elements of a processor section for performing data processing;

a second end portion having disposed thereon circuit elements of an input/output control section for controlling at least one input/output device; and a middle portion disposed between said first end portion and said second end portion and having disposed thereon circuit elements of a display control section for controlling said display means;

wherein said input means is disposed at a front side of said body; and wherein said circuit elements of said processor section include:

a central processing unit disposed adjacent to a rear side of said multi-layer printed circuit board, said rear side of said multi-layer printed circuit board being a side of said multi-layer printed circuit board furthest away from said front side of said body; and a main memory disposed adjacent to a front side of said multi-layer printed circuit board, said front side of said multi-layer printed circuit board being a side of said multi-layer printed circuit board nearest to said front side of said body.

15. A space-saving information processing apparatus according to claim 14, wherein said circuit elements of said display control section include an image controller, a frame memory, and a font memory; and wherein said frame memory and said font memory are disposed adjacent to said front side of said multi-layer printed circuit board.

16. A space-saving information processing apparatus according to claim 14, wherein said multi-layer printed circuit board further includes:

a first connector arrangement region having disposed thereon a plurality of external connectors for connecting said apparatus with external devices disposed outside said body; and a second connector arrangement region having disposed thereon a plurality of internal connectors for connecting said apparatus with internal devices disposed inside said body.

17. A space-saving information processing apparatus according to claim 16, wherein said first connector arrangement region extends along said rear side of said multi-layer printed circuit board; and wherein each of said external connectors has a vertical surface for connecting said apparatus to a respective one of said external devices, and a horizontal surface for mounting said external connector on said multi-layer printed circuit board.

18. A space-saving information processing apparatus according to claim 16; wherein said second connector arrangement region is disposed on a rear side of said frame memory; and wherein each of said internal connectors has a first horizontal surface parallel to said multi-layer printed circuit board for connecting said apparatus to a respective one of said internal devices, and a second horizontal surface for mounting said internal connector on said multi-layer printed circuit board.

19. A space-saving information processing apparatus according to claim 18, wherein said internal connectors include at least one internal connector for connecting said apparatus to an expansion memory disposed inside said body.

20. A space-saving information processing apparatus comprising:
   a body having an information processing function;
   display means for displaying information, said display means being pivotally coupled to said body;
   input means for entering data, said input means being separate from said body; and
   a multi-layer printed circuit board disposed in said body, said multi-layer printed circuit board including:
      a first end portion having disposed thereon circuit elements of a processor section for performing data processing;
      a second end portion having disposed thereon circuit elements of an input/output control section for controlling at least one input/output device; and
      a middle portion disposed between said first end portion and said second end portion and having disposed thereon circuit elements of a display control section for controlling said display means;
   wherein said multi-layer printed circuit board is disposed in said body along a bottom surface of said body such that a largest dimension of said multi-layer printed circuit board extends in a width direction of said body; and
   wherein said apparatus further comprises:
      at least one disk type storage unit disposed in said body above said multi-layer printed circuit board; and
      a power source unit disposed in said body above said at least one disk type storage unit.

21. A space-saving information processing apparatus according to claim 20, further comprising an option package disposed in said body between said multi-layer printed circuit board and said at least one disk type storage unit.

22. A space-saving information processing apparatus according to claim 21, wherein said option package includes a printed circuit board having circuit elements disposed thereon; and
   wherein said option package is disposed in said body such that said circuit elements of said option package oppose said circuit elements of said multi-layer printed circuit board with a predetermined distance therebetween.

23. A space-saving information processing apparatus according to claim 20, wherein said at least one disk type storage unit includes:
   a hard disk drive; and
   a floppy disk drive;
   wherein said hard disk drive and said floppy disk drive are disposed side by side in a direction of said largest dimension of said multi-layer printed circuit board.

24. A space-saving information processing apparatus according to claim 18, wherein said multi-layer printed circuit board further includes:
   a system bus disposed on a rear side of said second connector arrangement region; and
   an image bus disposed on a front side of said second connector arrangement region.

25. A space-saving information processing apparatus comprising:
   a body having an information processing function;
   display means for displaying information, said display means being pivotally coupled to said body;
   input means for entering data, said input means being separate from said body; and
   a multi-layer printed circuit board disposed in said body, said multi-layer printed circuit board including:
      a first end portion having disposed thereon circuit elements of a processor section for performing data processing;
      a second end portion having disposed thereon circuit elements of an input/output control section for controlling at least one input/output device; and
      a middle portion disposed between said first end portion and said second end portion and having disposed thereon circuit elements of a display control section for controlling said display means;
   wherein said display means has a display surface and a non-display surface; and
   wherein said apparatus further comprises:
      a first pilot portion disposed on said display surface; and
      a second pilot portion disposed on said non-display surface.

26. A space-saving information processing apparatus comprising:
   a body having an information processing function;
   display means for displaying information, said display means being pivotally coupled to said body;
   input means for entering data, said input means being separate from said body; and
   a multi-layer printed circuit board disposed in said body, said multi-layer printed circuit board including:
      a first end portion having disposed thereon circuit elements of a processor section for performing data processing;
      a second end portion having disposed thereon circuit elements of an input/output control section for controlling at least one input/output device; and
      a middle portion disposed between said first end portion and said second end portion and having disposed thereon circuit elements of a display control section for controlling said display means;
   wherein said display means has a display surface and a non-display surface;
   wherein said apparatus further comprises:
      a first pilot portion disposed on said display surface; and
      a second pilot portion disposed on said non-display surface;
      wherein said first pilot portion includes a first emitter having a flat surface exposed on said display surface;
      wherein said second pilot portion includes a second emitter having a curved surface exposed on said non-display surface;
   wherein said apparatus further comprises:
      a light emitting diode for emitting light; and
      a reflector portion for reflecting said light emitted from said light emitting diode into said first emitter and said second emitter;
      wherein said light reflected into said first emitter is emitted from said flat surface of said first emitter as light having a relatively strong directivity; and
      wherein said light reflected into said second emitter is emitted from said curved surface of said second emitter as diffused light.

27. A space-saving information processing apparatus comprising:

a body having an information processing function;

display means for displaying information, said display means being pivotally coupled to said body such that said display means is pivotable between a completely closed position and a completely open position;

input means for inputting data, said input means being separate from said body;

an input means supporting portion extending from said body such that said input means can be sandwiched between said input means supporting portion and said display means when said display means is pivoted to said completely closed position;

power supply means disposed in said body at an uppermost portion of said body;

at least one disk type storage means disposed in said body under said power supply means;

a multi-layer printed circuit board disposed in said body under said at least one disk type storage means, said multi-layer printed circuit board including
   a first end portion having disposed thereon circuit elements of a processor section for performing data processing,
   a second end portion having disposed thereon circuit elements of an input/output control section for controlling at least one input/output device, and
   a middle portion disposed between said first end portion and said second end and having disposed thereon circuit elements of a display control section for controlling said display means;

detachment detecting means for detecting when said input means is detached from said body; and pivotal movement restricting means for restricting a range of pivotal movement of said display means when said detachment detecting means detects that said input means is detached from said body.

* * * * *